United States Patent
Oh et al.

(10) Patent No.: US 12,550,084 B2
(45) Date of Patent: Feb. 10, 2026

(54) METHOD BY WHICH TERMINAL TRANSMITS/RECEIVES SIGNAL IN WIRELESS COMMUNICATION SYSTEM, AND DEVICE

(71) Applicant: LG ELECTRONICS INC., Seoul (KR)

(72) Inventors: Jong Ok Oh, Seoul (KR); Young Dae Kim, Seoul (KR); Bong Jun Hwang, Seoul (KR); Hyunmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 567 days.

(21) Appl. No.: 17/920,980

(22) PCT Filed: Apr. 27, 2021

(86) PCT No.: PCT/KR2021/005280
§ 371 (c)(1),
(2) Date: Oct. 24, 2022

(87) PCT Pub. No.: WO2021/221419
PCT Pub. Date: Nov. 4, 2021

(65) Prior Publication Data
US 2023/0171714 A1    Jun. 1, 2023

(30) Foreign Application Priority Data
Apr. 27, 2020   (KR) .................. 10-2020-0050506

(51) Int. Cl.
*H04W 56/00*       (2009.01)
*H04W 4/40*        (2018.01)
(Continued)

(52) U.S. Cl.
CPC ........... *H04W 56/001* (2013.01); *H04W 4/40* (2018.02); *H04W 72/232* (2023.01); *H04W 72/40* (2023.01)

(58) Field of Classification Search
CPC ....... H04W 4/40; H04W 40/18; H04W 40/24; H04W 56/001; H04W 56/0015;
(Continued)

(56) References Cited

U.S. PATENT DOCUMENTS 11,510,179 B2 *  11/2022  Chae .................. H04W 72/0453
12,267,855 B2 *   4/2025  Kim ..................... H04W 72/232
(Continued)

OTHER PUBLICATIONS

R2-2000481, 3GPP TSG-RAN WG2 Meeting #109-e, Electronic meeting, Feb. 24-Mar. 6, 2020, Agenda Item: 6.1.1, Source: Qualcomm (Rapporteur) Title: Email discussion [108#51][IAB]: BAP functional view, Document for: Discussion and Decision, (9 pages).
(Continued)

*Primary Examiner* — Marcus Smith
*Assistant Examiner* — Kai Chang
(74) *Attorney, Agent, or Firm* — BRYAN CAVE LEIGHTON PAISNER LLP

(57) ABSTRACT

The method of performing local routing comprises configuring a next hop and a destination IAB address in a first IAB node based on an IAB donor, receiving a V2X message from a first terminal accessing the first IAB node, and transmitting the V2X message to a second terminal accessing a second IAB node through the second IAB node based on the local routing. When the first IAB node receives the V2X message from the first terminal through a V2X radio bearer, a backhaul adaptation protocol (BAP) packet data unit (PDU) comprising a BAP header with a V2X local routing bit set to enable and the V2X message may be generated, and the V2X
(Continued)

message may be transmitted to the second terminal through the second IAB node based on a BAP layer.

13 Claims, 36 Drawing Sheets

(51) Int. Cl.
*H04W 72/232* (2023.01)
*H04W 72/40* (2023.01)

(58) Field of Classification Search
CPC ............... H04W 72/232; H04W 72/25; H04W 72/40; H04W 84/04; H04W 84/047
See application file for complete search history.

(56) References Cited

U.S. PATENT DOCUMENTS

| | | | | |
|---|---|---|---|---|
| 2018/0146494 A1* | 5/2018 | Khoryaev | ............ | H04W 76/15 |
| 2019/0223078 A1 | 7/2019 | Sirotkin et al. | | |
| 2021/0127293 A1* | 4/2021 | Hong | ................ | H04W 28/0278 |
| 2021/0306824 A1* | 9/2021 | Li | ........................... | H04W 4/40 |
| 2022/0174579 A1* | 6/2022 | Zhuo | ....................... | H04L 69/22 |
| 2022/0182917 A1* | 6/2022 | Muhammad | ........ | H04W 40/248 |
| 2022/0225383 A1* | 7/2022 | Fujishiro | ............ | H04B 7/15528 |
| 2022/0346088 A1* | 10/2022 | Liu | ................... | H04W 72/0446 |
| 2023/0036769 A1* | 2/2023 | Wu | ........................ | H04W 40/34 |
| 2023/0189301 A1* | 6/2023 | Zhao | ..................... | H04L 5/0055 |
| | | | | 370/329 |

OTHER PUBLICATIONS

R2-2000518, 3GPP TSG-RAN WG2 Meeting #109 electronic, Feb. 24-Mar. 6, 2020, Source: Huawei, HiSilicon, Title: Remaining issues for routing, Agenda Item: 6.1.3, Document for: Discussion and Decision, (4 pages).

R2-2000903, 3GPP TSG-RAN WG2 Meeting #109 electronic, Elbonia, Feb. 24-Mar. 6, 2020, Revision of R2-1915196, Agenda Item: 6.1.3, Source: CMCC, Title: BAP mapping support for routing, Document for: Discussion, (4 pages).

R2-2001563, 3GPP TSG-RAN WG2 Meeting #109 electronic, Elbonia, Feb. 24-Mar. 6, 2020, Agenda Item: 6.1.3 (NR_IAB-Core); Source: LG Electronics Inc., Title: Consideration on local routing in IAB, Document for: Discussion and Decision, (4 pages).

* cited by examiner

UE:SA with NGC
IAB-node:SA with NGC

METHOD BY WHICH TERMINAL TRANSMITS/RECEIVES SIGNAL IN WIRELESS COMMUNICATION SYSTEM, AND DEVICE

CROSS-REFERENCE TO RELATED APPLICATIONS

This application is a National Stage Filing Under 35 U.S.C. 371 of International Application No. PCT/KR2021/005280, filed on Apr. 27, 2021, which claims priority to Korean Application No. 10-2020-0050506, filed on Apr. 27, 2020, the contents of which are all hereby incorporated by reference herein in their entirety.

BACKGROUND

Field

The present disclosure relates to a wireless communication system and, more particularly, to a signal transmission and reception method and device of a terminal in a wireless communication system.

In particular, it relates to a method of performing local routing for sidelink (SL) communication in an integrated access and backhaul (IAB) node based on IAB.

Description of the Related Art

A wireless communication system is a multiple access system that supports communication of multiple users by sharing available system resources (e.g., a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (mMTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

The present disclosure relates to a method and device for transmitting and receiving a signal between terminals in a wireless communication system.

The present disclosure relates to a method of performing local routing for sidelink data through an IAB node in a wireless communication system.

The present disclosure relates to a method of receiving data in an IAB node based on a V2X radio bearer and performing local routing in a wireless communication system.

The present disclosure relates to a method of configuring local routing at an IAB node based on an IAB donor in a wireless communication system.

The technical objects to be achieved in the present disclosure are not limited to the matters mentioned above, and other technical problems which are not described herein may be considered by those of ordinary skill in the art, to which the technical configuration of the present disclosure is applied, from the embodiments of the present disclosure to be described below.

As an example of the present disclosure, a method of performing local routing in an integrated access and backhaul (IAB) node in a wireless communication system comprises configuring a next hop and a destination IAB address in a first IAB node based on an IAB donor, receiving a V2X message from a first terminal accessing the first IAB node, and transmitting the V2X message to a second terminal accessing a second IAB node through the second IAB node based on the local routing. When the first IAB node receives the V2X message from the first terminal through a V2X radio bearer, a backhaul adaptation protocol (BAP) packet data unit (PDU) comprising a BAP header with a V2X local routing bit set to enable and the V2X message may be generated, and the V2X message may be transmitted to the second terminal through the second IAB node based on a BAP layer.

As an example of the present disclosure, a method of transmitting a signal by a terminal based on local routing in a wireless communication system comprises a first terminal setting up a PDU session with an integrated access and backhaul (IAB) donor through a first IAB node and accessing the first IAB node, a next hop and a destination IAB address being configured in the first IAB node based on the IAB donor and the first terminal transmitting a V2X message to a second terminal accessing a second IAB node through the first IAB node. The first terminal may transmit a V2X message to the first IAB node through a V2X radio bearer, and a BAP PDU comprising a BAP header with a V2X local routing bit set to enable and the V2X message may be generated in the first IAB node and transmitted to the second terminal through the second IAB node based on a BAP layer.

As an example of the present disclosure, a first integrated access and backhaul (IAB) node performing local routing in a wireless communication system comprises a transceiver and a processor connected to the transceiver. The processor may configure a next hop and a destination IAB address of a first IAB node based on an IAB donor, receive a V2X message from a first terminal accessing the first IAB node, and transmit the V2X message to a second terminal accessing the second IAB node through a second IAB node based on the local routing. When the first IAB node receives the V2X message from the first terminal through a V2X radio bearer, a backhaul adaptation protocol (BAP) packet data unit (PDU) comprising a BAP header with a V2X local routing bit set to enable and the V2X message may be generated, and the V2X message may be transmitted to the second terminal through the second IAB node based on a BAP layer.

As an example of the present disclosure, a first terminal transmitting a signal based on local routing in a wireless communication system comprises a transceiver and a processor connected to the transceiver. The processor may set up a PDU session with an integrated access and backhaul (IAB) donor through a first IAB node and accessing the first IAB node, a next hop and a destination IAB address being configured in the first IAB node based on the IAB donor, and transmitting a V2X message to a second terminal accessing a second IAB node through the first IAB node. The first terminal may transmit a V2X message to the first IAB node through a V2X radio bearer, and a BAP PDU comprising a BAP header with a V2X local routing bit set to enable and the V2X message may be generated and transmitted to the second terminal through the second IAB node based on a BAP layer.

As an example of the present disclosure, a device comprises at least one memory and at least one processor functionally connected to the at least one memory. The processor may enable the device to configure a next hop and a destination IAB address of the device based on an IAB donor, to receive a V2X message from a first terminal accessing the device and to transmit the V2X message to a second terminal accessing another device through the other device based on the local routing. When the device receives the V2X message from the first terminal through a V2X radio bearer, a backhaul adaptation protocol (BAP) packet data unit (PDU) comprising a BAP header with a V2X local routing bit set to enable and the V2X message may be generated, and the V2X message may be transmitted to the second terminal through the other device based on a BAP layer.

As an example of the present disclosure, a non-transitory computer-readable medium storing at least one instruction comprises the at least one instruction executable by a processor. The at least one instruction enables the device to configure a next hop and a destination IAB address of a device based on an IAB donor, to receive a V2X message from a first terminal accessing the device, and to transmit the V2X message to a second terminal accessing another device through the other device based on the local routing. When the device receives the V2X message from the first terminal through a V2X radio bearer, a backhaul adaptation protocol (BAP) packet data unit (PDU) comprising a BAP header with a V2X local routing bit set to enable and the V2X message may be generated, and the V2X message may be transmitted to the second terminal through the other device based on a BAP layer.

The following may be applied in common.

As an example of the present disclosure, the first IAB node may be provided with a packet data convergence protocol (PDCP) sublayer for V2X, and the V2X message may be received from the first terminal through a radio link control (RLC) layer of the first IAB node and delivered to the PDCP sublayer for V2X.

As an example of the present disclosure, the PDCP sublayer for V2X may add security parameter settings to the V2X message and deliver it to the BAP layer.

As an example of the present disclosure, the V2X message may comprise information on the second terminal to which the V2X message is delivered.

As an example of the present disclosure, when the first IAB node is the same IAB node as the second IAB node, the V2X message may be delivered from the BAP layer to the PDCP layer for V2X, and the V2X message may be delivered from the PDCP layer for V2X to the second terminal through a lower layer.

As an example of the present disclosure, when the first IAB node and the second IAB node are different, the V2X message may be delivered from the first IAB node to the second IAB node through the BAP layer, and may be delivered to the PDCP layer for V2X of the second IAB node based on the BAP layer and then is transmitted to the second terminal through a lower layer.

As an example of the present disclosure, the BAP header may further comprise destination IAB node information, and the second IAB node may transmit the V2X message to the second terminal through the BAP layer, when the destination IAB node of the BAP header is the second IAB node based on the V2X local routing bit, which is set to enable, of the BAP header.

As an example of the present disclosure, only when V2X local routing is configured in the second IAB node, the V2X message may be transmitted to the second terminal accessing the second IAB node.

As an example of the present disclosure, when the first IAB node and the second IAB node are different, the V2X message may be transmitted from the first IAB node to the second terminal of the second IAB node through a third IAB node based on the BAP layer.

As an example of the present disclosure, the third IAB node may be an IAB node in which V2X local routing is not configured and the second IAB node may be an IAB node in which the V2X local routing is configured.

As an example of the present disclosure, the first terminal and the IAB node may set up a PDU session through the first IAB node based on ID information of the first terminal, and, when the PDU session is set up, the first IAB node may receive PDCP configuration information for V2X and V2X local routing configuration information from the IAB donor node.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

The following effects may be obtained by the embodiments based on the present disclosure.

According to the present disclosure, the present disclosure may provide a method of transmitting and receiving a signal between terminals in a wireless communication system.

The present disclosure has an effect of reducing latency in sidelink communication by performing local routing for sidelink data through an IAB node in a wireless communication system.

The present disclosure has the effect of receiving data in an IAB node based on a V2X radio bearer in the wireless communication system, performing local routing and delivering sidelink data when sidelink communication is difficult due to an obstacle.

The present disclosure has an effect of efficiently transmitting sidelink data by configuring local routing in an IAB node based on an IAB donor in a wireless communication system.

It will be appreciated by persons skilled in the art that that the effects that can be achieved through the present disclosure are not limited to what has been particularly described hereinabove and other advantages of the present disclosure will be more clearly understood from the detailed description. That is, unintended effects of implementing the configuration described in the present disclosure may also be derived by those of ordinary skill in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

DETAILED DESCRIPTION

Figure 1:
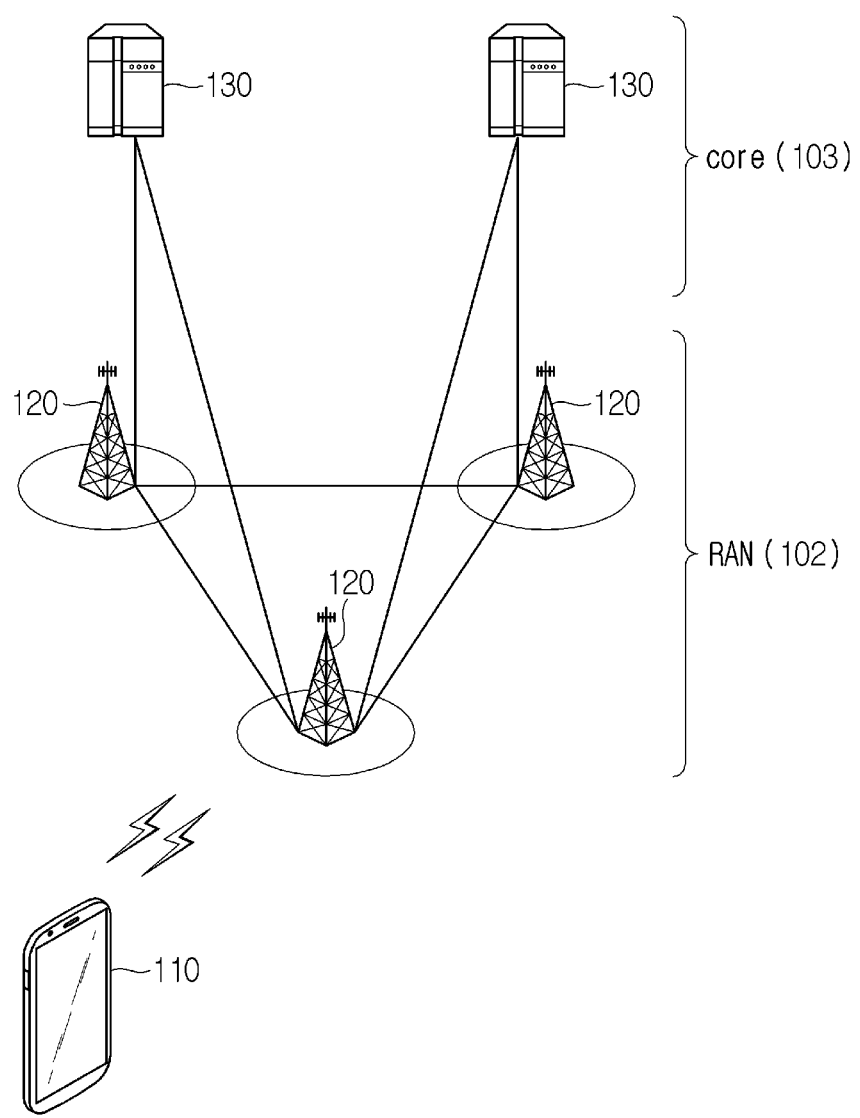
FIG. 1 illustrates a structure of a wireless communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information"

In the following description, 'when, if, in case of' may be replaced with 'on the basis of/based on'.

A technical feature described individually in one figure in the present specification may be individually implemented, or may be simultaneously implemented.

In this specification, a higher layer parameter may be set for a terminal, set in advance, or predefined. For example, a base station or a network may transmit a higher layer parameter to a terminal. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, reference may be made to a wireless communication standard document published before this specification is filed. For example, the following document may be referred to.

(1) 3GPP LTE
  3GPP TS 36.211: Physical channels and modulation
  3GPP TS 36.212: Multiplexing and channel coding
  3GPP TS 36.213: Physical layer procedures
  3GPP TS 36.214: Physical layer; Measurements
  3GPP TS 36.300: Overall description
  3GPP TS 36.304: User Equipment (UE) procedures in idle mode
  3GPP TS 36.314: Layer 2—Measurements
  3GPP TS 36.321: Medium Access Control (MAC) protocol
  3GPP TS 36.322: Radio Link Control (RLC) protocol
  3GPP TS 36.323: Packet Data Convergence Protocol (PDCP)
  3GPP TS 36.331: Radio Resource Control (RRC) protocol (2) 3GPP NR (e.g. 5G)
  3GPP TS 38.211: Physical channels and modulation
  3GPP TS 38.212: Multiplexing and channel coding
  3GPP TS 38.213: Physical layer procedures for control
  3GPP TS 38.214: Physical layer procedures for data
  3GPP TS 38.215: Physical layer measurements
  3GPP TS 38.300: Overall description
  3GPP TS 38.304: User Equipment (UE) procedures in idle mode and in RRC inactive state
  3GPP TS 38.321: Medium Access Control (MAC) protocol
  3GPP TS 38.322: Radio Link Control (RLC) protocol
  3GPP TS 38.323: Packet Data Convergence Protocol (PDCP)
  3GPP TS 38.331: Radio Resource Control (RRC) protocol
  3GPP TS 37.324: Service Data Adaptation Protocol (SDAP)
  3GPP TS 37.340: Multi-connectivity; Overall description Communication System to which the Present Disclosure is Applicable FIG. 1 illustrates a structure of a wireless communication system according to an embodiment of the present disclosure. The embodiment of FIG. 1 may be combined with various embodiments of the present disclosure.

Referring to FIG. 1, the wireless communication system includes a radio access network (RAN) 102 and a core network 103. The radio access network 102 includes a base station 120 that provides a control plane and a user plane to a terminal 110. The terminal 110 may be fixed or mobile, and may be called a user equipment (UE), a mobile station (MS), a subscriber station (SS), a mobile subscriber station (MSS), a mobile terminal, an advanced mobile station (AMS), or a wireless device. The base station 120 refers to a node that provides a radio access service to the terminal 110, and may be called a fixed station, a Node B, an eNB (eNode B), a gNB (gNode B), an ng-eNB, an advanced base station (ABS) or an access point, a base transceiver system (BTS), or an access point (AP). The core network 103 includes a core network entity 130. The core network entity 130 may be defined in various ways according to functions, and may be called other terms such as a core network node, a network node, and a network equipment.

Components of a system may be referred to differently according to an applied system standard. In the case of LTE or LTE-A standard, the radio access network 102 may be referred to as an Evolved-UMTS Terrestrial Radio Access Network (E-UTRAN), and the core network 103 may be referred to as an evolved packet core (EPC). In this case, the core network 103 includes a Mobility Management Entity (MME), a Serving Gateway (S-GW), and a packet data network-gateway (P-GW). The MME has access information of a terminal or information on the capability of the terminal, and this information is mainly used for mobility management of the terminal. The S-GW is a gateway having an E-UTRAN as an endpoint, and the P-GW is a gateway having a packet data network (PDN) as an endpoint.

In the case of 5G NR standard, the radio access network 102 may be referred to as NG-RAN, and the core network 103 may be referred to as 5GC (5G core). In this case, the core network 103 includes an access and mobility management function (AMF), a user plane function (UPF), and a session management function (SMF). The AMF provides a function for access and mobility management in units of terminals, the UPF performs a function of mutually transferring data units between an upper data network and the radio access network 102, and the SMF provides a session management function.

The BSs 120 may be connected to one another via Xn interface. The BS 120 may be connected to one another via core network 103 and NG interface. More specifically, the BSs 130 may be connected to an access and mobility management function (AMF) via NG-C interface, and may be connected to a user plane function (UPF) via NG-U interface.

Figure 2:
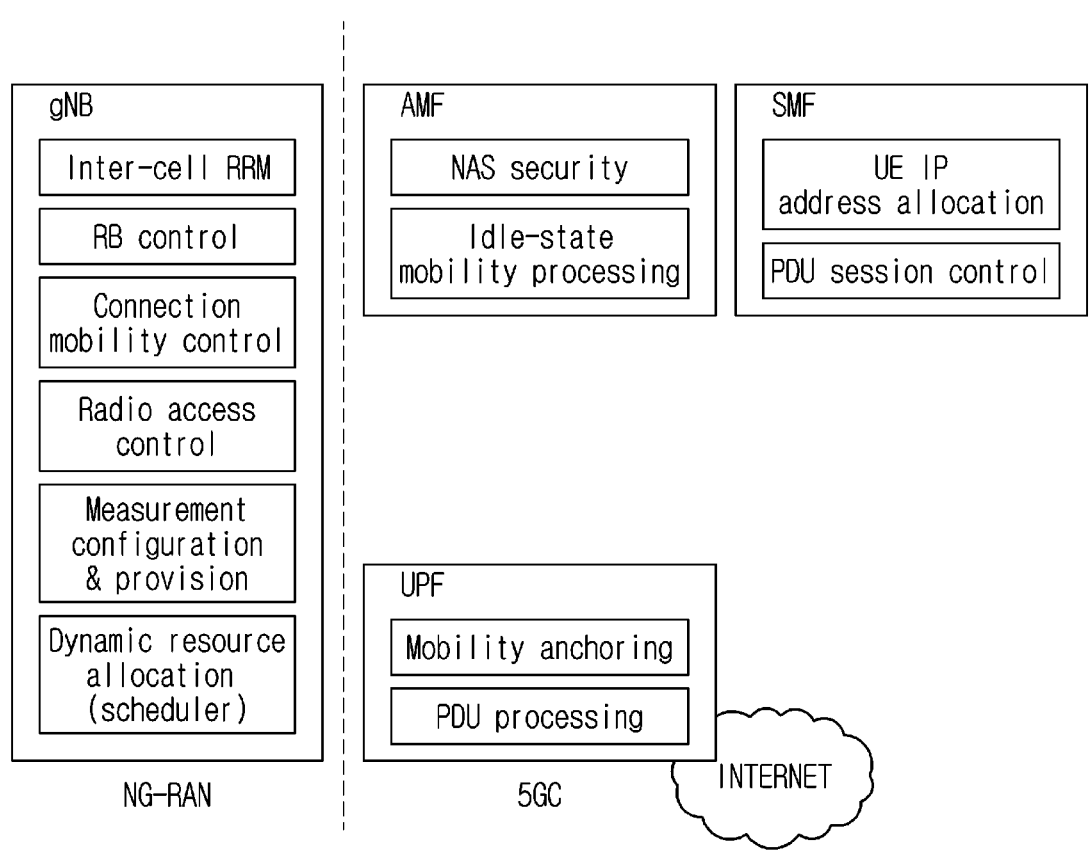
FIG. 2 illustrates a functional division between an NG-RAN and a SGC applicable to the present disclosure.

FIG. 2 illustrates a functional division between an NG-RAN and a 5GC applicable to the present disclosure. The embodiment of FIG. 2 may be combined with various embodiments of the present disclosure.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer enable to exchange an RRC message between the UE and the BS.

Figure 3A:
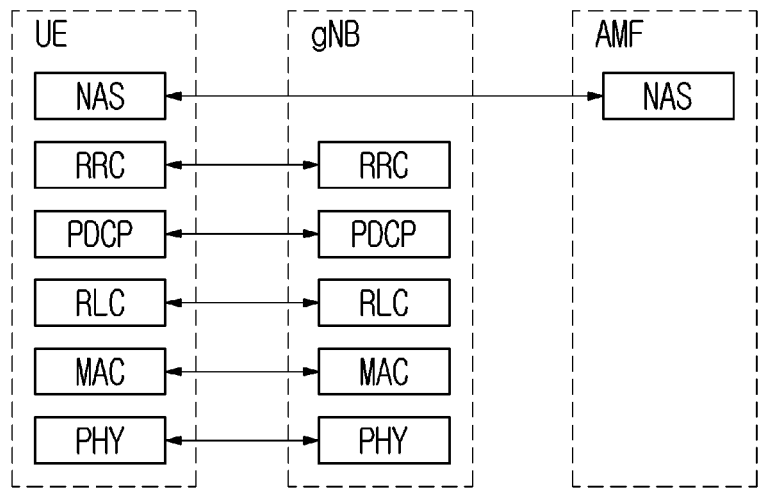
FIG. 3 illustrates a radio protocol architecture applicable to the present disclosure.
Figure 3B:
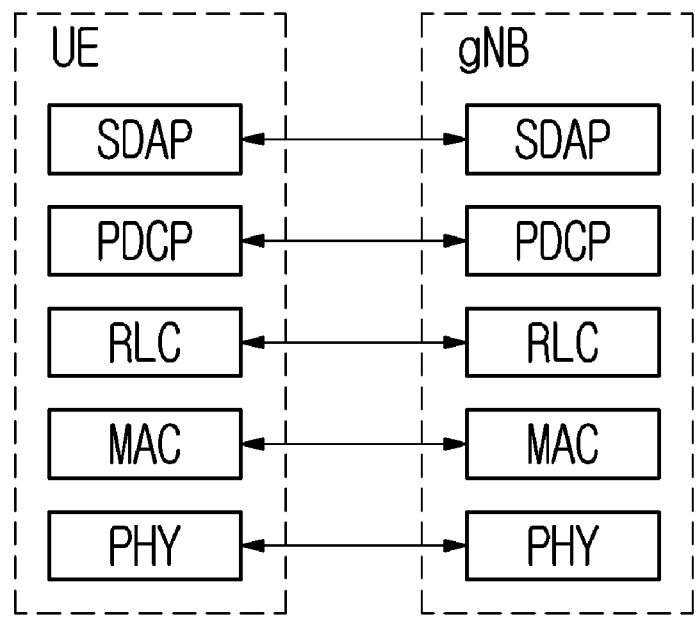

FIGS. 3A and 3B illustrate a radio protocol architecture applicable to the present disclosure. The embodiment of FIG. 3 may be combined with various embodiments of the present disclosure. Specifically, FIG. 3A exemplifies a radio protocol architecture for a user plane, and FIG. 3B exemplifies a radio protocol architecture for a control plane. The user plane corresponds to a protocol stack for user data transmission, and the control plane corresponds to a protocol stack for control signal transmission.

Referring to FIGS. 3A and 3B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PI-TY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Radio Resource Structure

Figure 4:
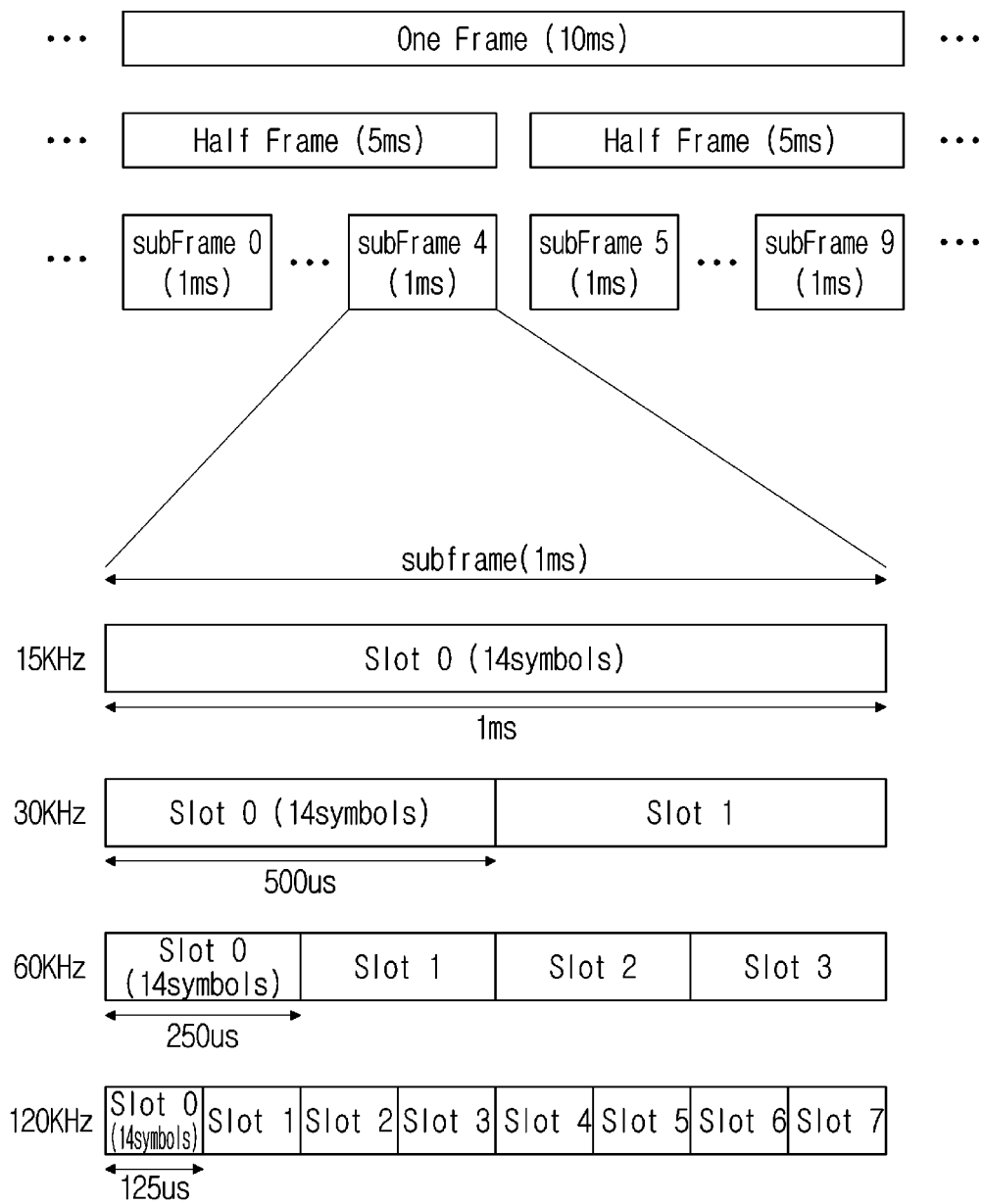
FIG. 4 illustrates a structure of a radio frame in an NR system applicable to the present disclosure.

FIG. 4 illustrates a structure of a radio frame in an NR system applicable to the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

In a case where a normal CP is used, a number of symbols per slot ($N^{slot}_{symb}$), a number slots per frame ($N^{frame,\mu}_{slot}$), and a number of slots per subframe ($N^{subframe,\mu}_{slot}$) may be varied based on an SCS configuration ($\mu$). For instance, SCS (=15*2$^\mu$), $N^{slot}_{symb}$, $N^{frame,\mu}_{slot}$ and $N^{subframe,\mu}_{slot}$ are 15 KHz, 14, 10 and 1, respectively, when $\mu$=0, are 30 KHz, 14, 20 and 2, respectively, when $\mu$=1, are 60 KHz, 14, 40 and 4, respectively, when $\mu$=2, are 120 KHz, 14, 80 and 8, respectively, when $\mu$=3, or are 240 KHz, 14, 160 and 16, respectively, when $\mu$=4. Meanwhile, in a case where an extended CP is used, SCS (=15*2$^\mu$), $N^{slot}_{symb}$, $N^{frame,\mu}$ and $N^{subframe,\mu}$ are 60 KHz, 12, 40 and 2, respectively, when $\mu$=2.

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, frequency ranges corresponding to the FR1 and FR2 may be 450 MHz-6000 MHz and 24250 MHz-52600 MHz, respectively. Further, supportable SCSs is 15, 30 and 60 kHz for the FR1 and 60, 120, 240 kHz for the FR2. Among the frequency ranges that are used in an NR system, FR1 may mean a "sub 6 GHz range", and FR2 may mean an "above 6 GHz range" and may also be referred to as a millimeter wave (mmW).

As described above, the values of the frequency ranges in the NR system may be changed (or varied). For example, comparing to examples for the frequency ranges described above, FR1 may be defined to include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

Figure 5:
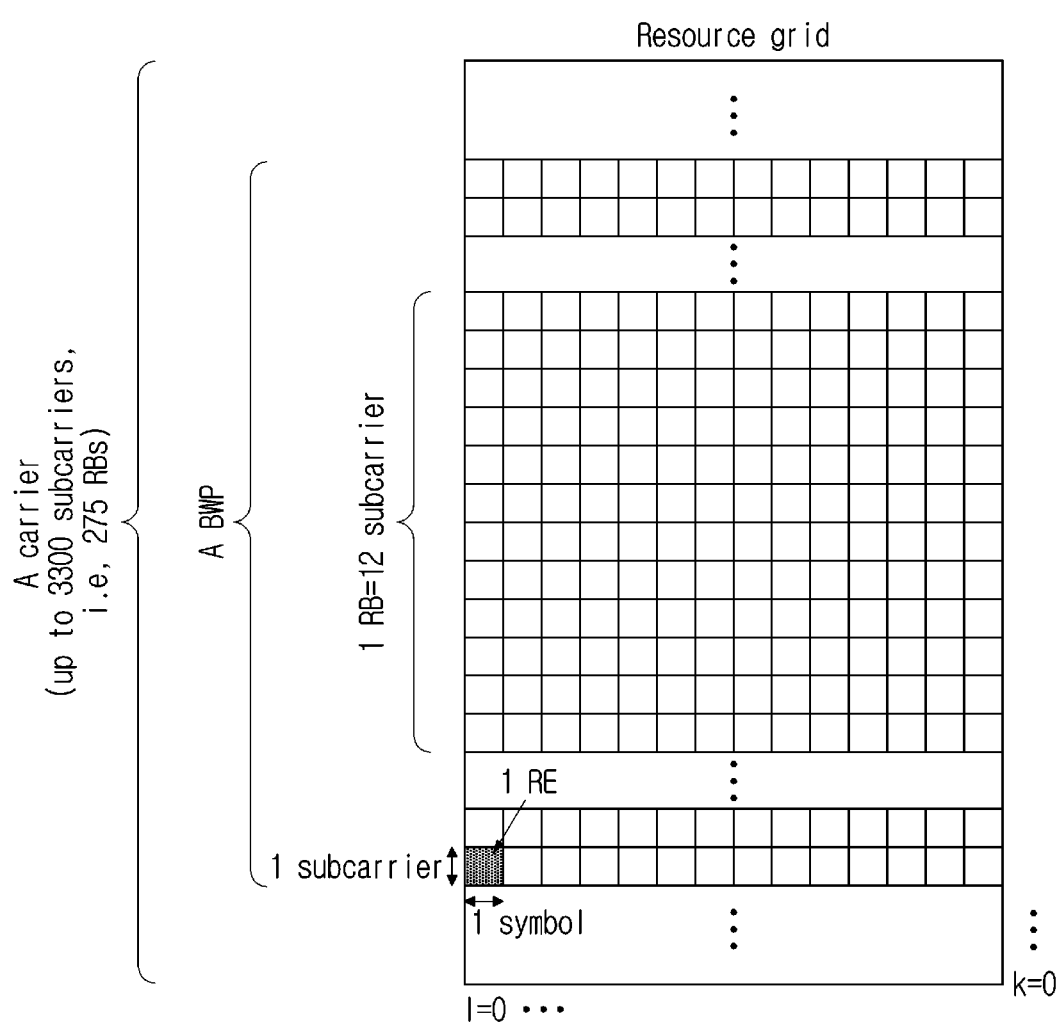
FIG. 5 illustrates a structure of a slot in an NR frame applicable to the present disclosure.

FIG. 5 illustrates a structure of a slot of an NR frame applicable to the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Bandwidth Part (BWP)

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit a Physical Uplink Control Channel (PUCCH) or a Physical Uplink Shared Channel (PUSCH) outside an active UL BWP. For example, in a downlink case, the initial BWP may be given as a consecutive RB set for a remaining minimum system information (RMSI) control resource set (CORESET) (configured by PBCH). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
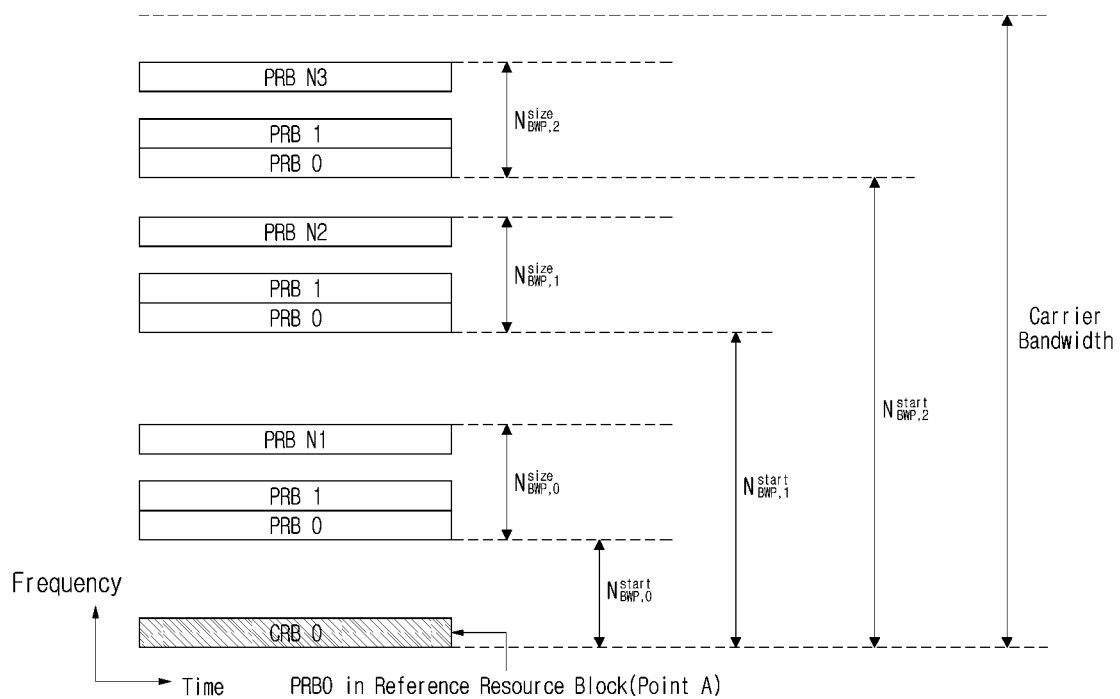
FIG. 6 illustrates an example of a BWP applicable to the present disclosure.

FIG. 6 illustrates an example of a BWP applicable to the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset ($N^{start}_{BWP}$) from the point A, and a bandwidth ($N^{size}_{BWP}$). For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

V2X or Sidelink Communication

Figure 7A:
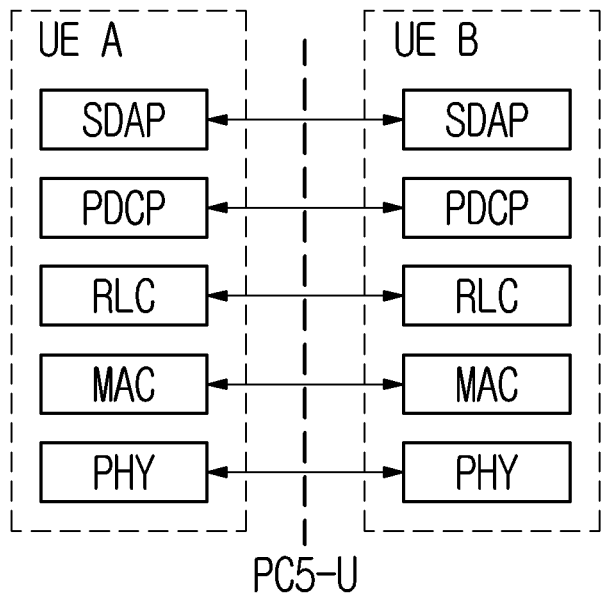
FIGS. 7A and 7B illustrate a radio protocol architecture for a SL communication applicable to the present disclosure.
Figure 7B:
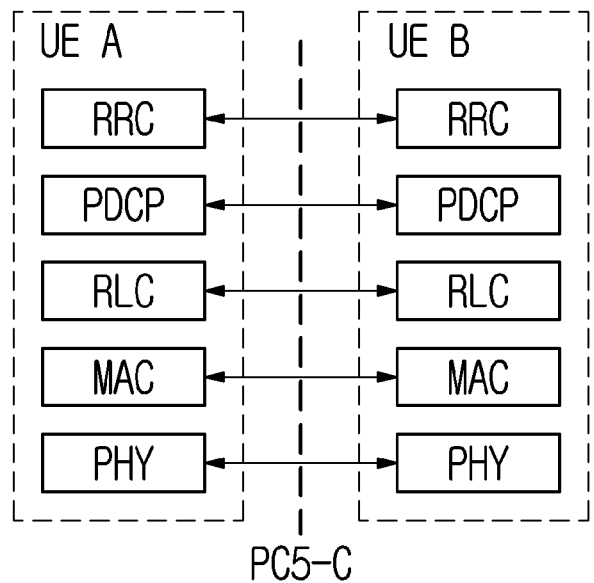

FIGS. 7A and 7B illustrate a radio protocol architecture for a SL communication applicable to the present disclosure. The embodiment of FIGS. 7A and 7B may be combined with various embodiments of the present disclosure. More specifically, FIG. 7A exemplifies a user plane protocol stack, and FIG. 7B exemplifies a control plane protocol stack.

Sidelink Synchronization Signal (SLSS) and Synchronization Information

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

For example, based on Table 1, the terminal may generate an S-SS/PSBCH block (that is, S-SSB), and the terminal may map the S-SS/PSBCH block (that is, S-SSB) on a physical resource and transmit it.

and master information block-sidelink-V2X (MIB-SL-V2X) may be used in the RLC layer.

Figure 8:
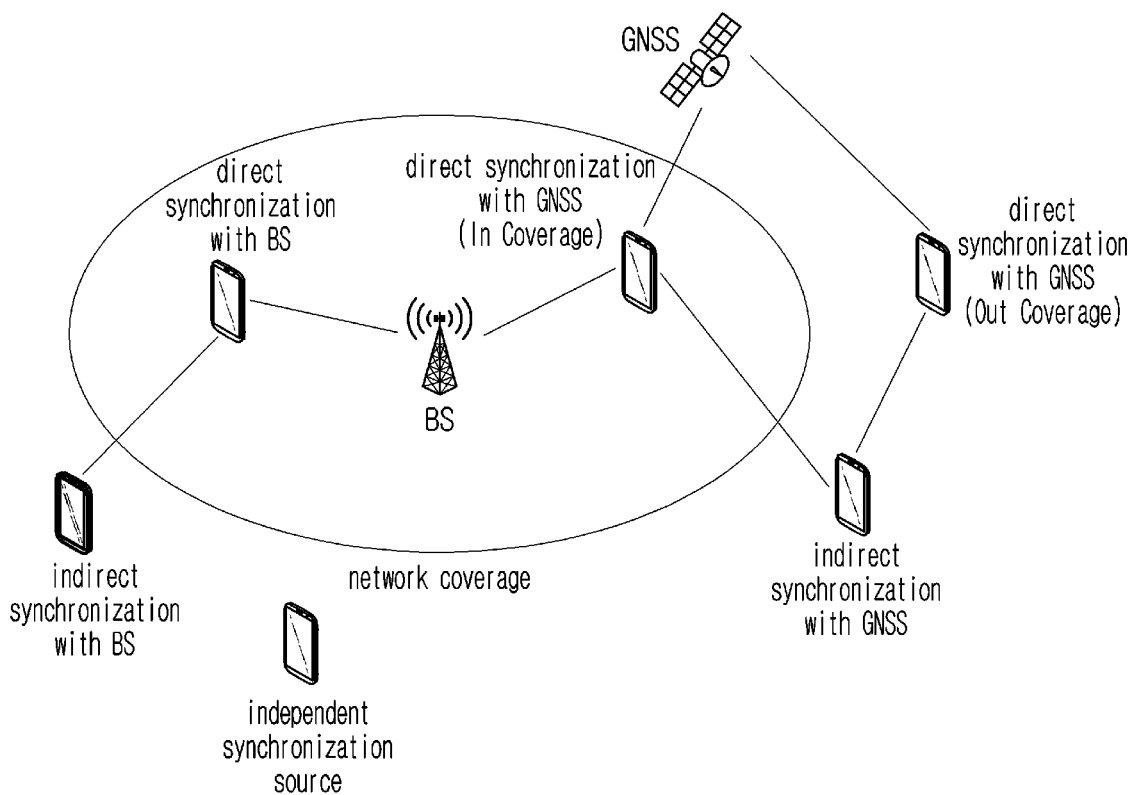
FIG. 8 illustrates a synchronization source or synchronization reference of V2X applicable to the present disclosure.

FIG. 8 illustrates a synchronization source or synchronization reference of V2X applicable to the present disclosure. The embodiment of FIG. 8 may be combined with various embodiments of the present disclosure.

Referring to FIG. 8, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or SL communica-

TABLE 1

8.4.3.1 Time-frequency structure of an S-SS/PSBCH block
In the time domain, an S-SS/PSBCH block consists of $N_{symb}^{S-SSB}$ OFDM symbols, numbered in increasing order from 0 to $N_{symb}^{S-SSB} - 1$ within the S-SS/PSBCH block, where S-PSS, S-SSS, and PSBCH with associated DM-RS are mapped to symbols as given by Table 8.4.3.1-1. The number of OFDM symbols in an S-SS/PSBCH block $N_{symb}^{S-SSB} = 13$ for normal cyclic prefix and $N_{symb}^{S-SSB} = 11$ for extended cyclic prefix. The first OFDM symbol in an S-SS/PSBCH block is the first OFDM symbol in the slot.
In the frequency domain, an S-SS/PSBCH block consists of 132 contiguous subcarriers with the subcarriers numbered in increasing order from 0 to 131 within the sidelink S-SS/PSBCH block. The quantities k and l represent the frequency and time indices, respectively, within one sidelink S-SS/PSBCH block.
For an S-SS/PSBCH block, the UE shall use
  - antenna port 4000 for transmission of S-PSS, S-SSS, PSBCH and DM-RS for PSBCH;
  - the same cyclic prefix length and subcarrier spacing for the S-PSS, S-SSS, PSBCH and DM-RS for PSBCH, Table 8.4.3.1-1: Resources within an S-SS/PSBCH block for S-PSS, S-SSS, PSBCH, and DM-RS.

| Channel or signal | OFDM symbol number l relative to the start of an S-SS/PSBCH block | Subcarrier number k relative to the start of an S-SS/PSBCH block |
|---|---|---|
| S-PSS | 1, 2 | 2, 3, . . . , 127, 128 |
| S-SSS | 3, 4 | 2, 3, . . . , 127, 128 |
| Set to zero | 1, 2, 3, 4 | 0, 1, 129, 130, 131 |
| PSBCH | 0, 5, 6, . . . , $N_{symb}^{S-SSB} - 1$ | 0, 1, . . . , 131 |
| DM-RS for PSBCH | 0, 5, 6, . . . , $N_{symb}^{S-SSB} - 1$ | 0, 4, 8, . . . , 128 |

Synchronization Acquisition of SL Terminal

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, tion. In this case, the UE may follow the synchronization configuration received from the BS. When the UE fails in detecting any cell in the carrier used for the V2X or SL communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

An SL synchronization source may be related to a synchronization priority. For example, the relationship between synchronization sources and synchronization priorities may be defined as shown in [Table 2] or [Table 3]. [Table 2] or [Table 3] is merely an example, and the relationship between synchronization sources and synchronization priorities may be defined in various manners.

TABLE 2

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with NB/gNB |
| P2 | All UEs synchronized indirectly with GNSS | All UEs synchronized indirectly with eNB/gNB |
| P3 | All other UEs | GNSS |
| P4 | N/A | All UEs synchronized directly with GNSS |
| P5 | N/A | All UEs synchronized indirectly with GNSS |
| P6 | N/A | All other UEs |

TABLE 3

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | eNB/gNB | GNSS |
| P4 | All UEs synchronized directly with eNB/gNB | All UEs synchronized directly with GNSS |
| P5 | All UEs synchronized indirectly with eNB/gNB | All UEs synchronized indirectly with GNSS |
| P6 | Remaining UE(s) with lower priority | Remaining UE(s) with lower priority |

In [Table 2] or [Table 3], P0 may represent a highest priority, and P6 may represent a lowest priority. In [Table 2] or [Table 3], the BS may include at least one of a gNB or an eNB.

Whether to use GNSS-based synchronization or eNB/gNB-based synchronization may be (pre)determined. In a single-carrier operation, the UE may derive its transmission timing from an available synchronization reference with the highest priority.

For example, the terminal may (re)select a synchronization reference, and the terminal may obtain synchronization from the synchronization reference. In addition, the terminal may perform SL communication (e.g., PSCCH/PSSCH transmission/reception, Physical Sidelink Feedback Channel (PSFCH) transmission/reception, S-SSB transmission/reception, reference signal transmission/reception, etc.) based on the obtained synchronization.

Figure 9A:
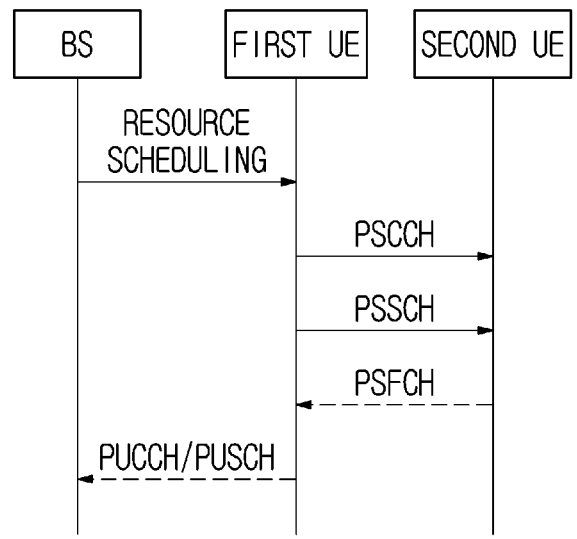
FIGS. 9A and 9B illustrate a procedure of performing V2X or SL communication by a terminal based on a transmission mode applicable to the present disclosure.
Figure 9B:
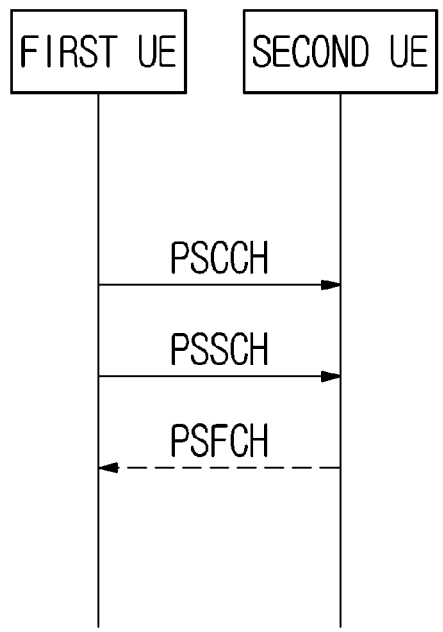

FIGS. 9A and 9B illustrate a procedure of performing V2X or SL communication by a terminal based on a transmission mode applicable to the present disclosure. The embodiment of FIGS. 9A and 9B may be combined with various embodiments of the present disclosure. In various embodiments of the present disclosure, the transmission mode may be called a mode or a resource allocation mode.

Hereinafter, for convenience of explanation, in LTE, the transmission mode may be called an LTE transmission mode. In NR, the transmission mode may be called an NR resource allocation mode.

For example, FIG. 9A exemplifies a UE operation related to an LTE transmission mode 1 or an LTE transmission mode 3. Alternatively, for example, FIG. 9B exemplifies a UE operation related to an NR resource allocation mode 1. For example, the LTE transmission mode 1 may be applied to general SL communication, and the LTE transmission mode 3 may be applied to V2X communication.

For example, FIG. 9B exemplifies a UE operation related to an LTE transmission mode 2 or an LTE transmission mode 4. Alternatively, for example, FIG. 9A exemplifies a UE operation related to an NR resource allocation mode 2.

Referring to FIG. 9A, in the LTE transmission mode 1, the LTE transmission mode 3, or the NR resource allocation mode 1, a BS may schedule an SL resource to be used by the UE for SL transmission. For example, the base station may transmit information related to SL resources and/or information related to UL resources to the first terminal. For example, the UL resources may include a PUCCH resource and/or a PUSCH resource. For example, the UL resources may be resources for reporting SL HARQ feedback to the base station.

For example, the first terminal may receive information related to a dynamic grant (DG) resource and/or information related to a configured grant (CG) resource from the base station. For example, the CG resource may include a CG type 1 resource or a CG type 2 resource. In this specification, the DG resource may be a resource configured/allocated by the base station to the first terminal through downlink control information (DCI). In this specification, the CG resource may be a (periodic) resource configured/allocated by the base station to the first terminal through DCI and/or RRC messages. For example, in the case of a CG type 1 resource, the base station may transmit an RRC message including information related to the CG resource to the first terminal. For example, in the case of a CG type 2 resource, the base station may transmit an RRC message including information related to the CG resource to the first terminal, and the base station may transmit DCI related to activation or release of the CG resource to the first terminal.

Subsequently, the first terminal may transmit a PSCCH (e.g., SCI (Sidelink Control Information) or $1^{st}$-stage SCI) to a second terminal based on the resource scheduling. Thereafter, the first terminal may transmit a PSSCH (e.g., $2^{nd}$-stage SCI, MAC PDU, data, etc.) related to the PSCCH to the second terminal. Thereafter, the first terminal may receive a PSFCH related to the PSCCH/PSSCH from the second terminal. For example, HARQ feedback information (e.g., NACK information or ACK information) may be received from the second terminal through the PSFCH. Thereafter, the first terminal may transmit/report HARQ feedback information to the base station through a PUCCH or PUSCH. For example, the HARQ feedback information reported to the base station may be information generated by the first terminal based on HARQ feedback information received from the second terminal. For example, the HARQ feedback information reported to the base station may be information generated by the first terminal based on a preset rule. For example, the DCI may be DCI for SL scheduling. For example, the format of the DCI may be DCI format 3_0 or DCI format 3_1. Table 4 shows an example of DCI for SL scheduling.

TABLE 4

3GPP TS 38.212

7.3.1.4.1 Format 3_0
DCI format 3_0 is used for scheduling of NR PSCCH and NR PSSCH in one cell.
The following information is transmitted by means of the DCI format 3_0 with CRC
scrambled by SL-RNTI or SL-CS-RNTI:
  - Resource pool index $-\lceil\log_2 I\rceil$ bits, where I is the number of resource pools for
    transmission configured by the higher layer parameter sl-TxPoolScheduling.
  - Time gap – 3 bits determined by higher layer parameter sl-DCI-ToSL-Trans, as
    defined in clause 8.1.2.1 of [6, TS 38.214]
  - HARQ process number – 4 bits as defined in clause 16.4 of [5, TS 38.213]
  - New data indicator – 1 bit as defined in clause 16.4 of [5, TS 38.213]
  - Lowest index of the subchannel allocation to the initial transmission –
    $\lceil\log_2(N_{subChannel}^{SL})\rceil$ bits as defined in clause 8.1.2.2 of [6, TS 38.214]
  - SCI format 1-A fields according to clause 8.3.1.1:
    - Frequency resource assignment.
    - Time resource assignment.
  - PSFCH-to-HARQ feedback timing indicator $-\lceil\log_2 N_{fb\_timing}\rceil$ bits, where $N_{fb\_timing}$ is
    the number of entries in the higher layer parameter sl-PSFCH-ToPUCCH, as
    defined in clause 16.5 of [5, TS 38.213]
  - PUCCH resource indicator – 3 bits as defined in clause 16.5 of [5, TS 38.213].
  - Configuration index – 0 bit if the UE is not configured to monitor DCI format 3_0
    with CRC scrambled by SL-CS-RNTI; otherwise 3 bits as defined in clause 8.1.2 of
    [6, TS 38.214]. If the UE is configured to monitor DCI format 3_0 with CRC
    scrambled by SL-CS-RNTI, this field is reserved for DCI format 3_0 with CRC
    scrambled by SL-RNTI.
  - Counter sidelink assignment index – 2 bits
    - 2 bits as defined in clause 16.5.2 of [5, TS 38.213] if the UE is configured with
      pdsch-HARQ-ACK-Codebook = dynamic
    - bits as defined in clause 16.5.1 of [5, TS 38.213] if the UE is configured with
      pdsch-HARQ-ACK-Codebook = semi-static
  - Padding bits, if required
7.3.1.4.2 Format 3_1
DCI format 3_1 is used for scheduling of LTE PSCCH and LTE PSSCH in one cell.
The following information is transmitted by means of the DCI format 3_1 with CRC
scrambled by SL-L-CS-RNTI:
  - Timing offset – 3 bits determined by higher layer parameter sl-TimeOffsetEUTRA,
    as defined in clause 16.6 of [5, TS 38.213]
  - Carrier indicator –3 bits as defined in 5.3.3.1.9A of [11, TS 36.212].
  - Lowest index of the subchannel allocation to the initial transmission –
    $\lceil\log_2(N_{subchannel}^{SL})\rceil$ bits as defined in 5.3.3.1.9A of [11, TS 36.212].
  - Frequency resource location of initial transmission and retransmission, as defined in
    5.3.3.1.9A of [11, TS 36.212]
  - Time gap between initial transmission and retransmission, as defined in 5.3.3.1.9A
    of [11, TS 36.212]
  - SL index – 2 bits as defined in 5.3.3.1.9A of [11, TS 36.212]
  - SL SPS configuration index – 3 bits as defined in clause 5.3.3.1.9A of [11, TS
    36.212].
  - Activation/release indication – 1 bit as defined in clause 5.3.3.1.9A of [11, TS
    36.212].

Referring to FIG. 9B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. For example, the first terminal that has selected a resource within the resource pool by itself may transmit a PSCCH (e.g., sidelink control information (SCI) or $1^{st}$-stage SCI) to the second terminal using the resource. Subsequently, the first terminal may transmit a PSSCH (e.g., $2^{nd}$-stage SCI, MAC PDU, data, etc.) related to the PSCCH to the second terminal. Thereafter, the first terminal may receive a PSFCH related to the PSCCH/PSSCH from the second terminal. Referring to FIG. 9A or 9B, for example, the first terminal may transmit the SCI to the second terminal on the PSCCH. Alternatively, for example, the first terminal may transmit two consecutive SCIs (e.g., 2-stage SCI) to the second terminal on the PSCCH and/or the PSSCH. In this case, the second terminal may decode two consecutive SCIs (e.g., 2-stage SCI) to receive the PSSCH from the first terminal. In this specification, the SCI transmitted on the PSCCH may be referred to as $1^{st}$ SCI, first SCI or $1^{st}$-stage SCI or $1^{st}$-stage SCI format, and SCI transmitted on the PSSCH is $2^{nd}$ SCI, second SCI, $2^{nd}$-stage SCI or $2^{nd}$-stage SCI format. For example, the $1^{st}$-stage SCI format may include SCI format 1-A, and the $2^{nd}$-stage SCI format may include SCI format 2-A and/or SCI format 2-B. Table 5 shows an example of the $1^{st}$-stage SCI format.

TABLE 6

3GPP TS 38.212

8.3.1.1 SCI format 1-A
SCI format 1-A is used for the scheduling of PSSCH and $2^{nd}$-stage-SCI on PSSCH
The following information is transmitted by means of the SCI format 1-A:
Priority-3 bits as specified in clause 5.4.3.3 of [12, TS 23.287] and clause
5.22.1.3.1 of [8, TS 38.321].

Frequency resource assignment $-\left\lceil \log_2\left(\frac{N_{subChannel}^{SL}\left(N_{subChannel}^{SL}+1\right)}{2}\right)\right\rceil$ bits when the value of the higher layer parameter sl-MaxNumPerReserve is configured to 2; otherwise $\left\lceil \log_2\left(\frac{N_{subChannel}^{SL}\left(N_{subChannel}^{SL}+1\right)\left(2N_{subChannel}^{SL}+1\right)}{6}\right)\right\rceil$ bits when the value of the higher layer parameter sl-MaxNumPerReserve is configured to 3. as defined in clause 8.1.2.2 of
[6, TS 38.214].
Time resource assignment-5 bits when the value of the higher layer parameter sl-
MaxNumPerReserve is configured to 2; otherwise 9 bits when the value of the
higher layer parameter sl-MaxNumPerReserve is configured to 3, as defined in
clause 8.1.2.1 of [6, TS 38.214].
Resource reservation period $-\lceil \log_2 N_{rsv\_period}\rceil$ bits as defined in clause 8.1.4 of [6,
TS 38.214], where $N_{rsv\_period}$ is the number of entries in the higher layer parameter
sl-ResourceReservePeriodList, if higher layer parameter sl-MultiReserveResource
is configured; 0 bit otherwise.
DMRS pattern $-\lceil \log_2 N_{pattern}\rceil$ bits as defined in clause 8.4.1.1.2 of [4, TS 38.211],
where $N_{pattern}$ is the number of DMRS patterns configured by higher layer
parameter sl-PSSCH-DMRS-TimePatternList.
$2^{nd}$-stage SCI format-2 bits as defined in Table 8.3.1.1-1.
Beta_offset indicator-2 bits as provided by higher layer parameter sl-
BetaOffsets2ndSCI and Table 8.3.1.1-2.
Number of DMRS port-1 bit as defined in Table 8.3.1.1-3.
Modulation and coding scheme-5 bits as defined in clause 8.1.3 of [6, TS 38.214].
Additional MCS table indicator-as defined in clause 8.1.3.1 of [6, TS 38.214]: 1 bit
if one MCS table is configured by higher layer parameter sl-Additional-MCS-Table;
2 bits if two MCS tables are configured by higher layer parameter sl-Additional-
MCS-Table; 0 bit otherwise.
PSFCH overhead indication-1 bit as defined clause 8.1.3.2 of [6, TS 38.214] if
higher layer parameter sl-PSFCH-Period = 2 or 4; 0 bit otherwise.
Reserved-a number of bits as determined by higher layer parameter sl-
NumReservedBits, with value set to zero.

Table 8.3.1.1-1: $2^{nd}$-stage SCI formats

| Value of 2nd-stage SCI format field | 2nd-stage SCI format |
| --- | --- |
| 00 | SCI format 2-A |
| 01 | SCI format 2-B |
| 10 | Reserved |
| 11 | Reserved |

Table 8.3.1.1-2: Mapping of Beta_offset indicator values to indexes in
Table 9.3-2 of [5, TS38.213]

| Value of Beta_offset indicator | Beta_offset index in Table 9.3-2 of [5, TS38.213] |
| --- | --- |
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

Table 8.3.1.1-3: Number of DMRS port(s)

| Value of the Number of DMRS port field | Antenna ports |
| --- | --- |
| 0 | 1000 |
| 1 | 1000 and 1001 |

Table 6 shows an example of a $2^{nd}$-stage SCI format.

TABLE 6

3GPP TS 38.212

8.4.1.1 SCI format 2-A
SCI format 2-A is used for the decoding of PSSCH, with HARQ operation when HARQ-ACK information includes ACK or NACK, when HARQ-ACK information includes only NACK, or when there is no feedback of HARQ-ACK information.
The following information is transmitted by means of the SCI format 2-A:
 - HARQ process number – 4 bits as defined in clause 16.4 of [5, TS 38.213].
 - New data indicator – 1 bit as defined in clause 16.4 of [5, TS 38.213].
 - Redundancy version – 2 bits as defined in clause 16.4 of [6, TS 38.214].
 - Source ID – 8 bits as defined in clause 8.1 of [6, TS 38.214].
 - Destination ID – 16 bits as defined in clause 8.1 of [6, TS 38.214].
 - HARQ feedback enabled/disabled indicator – 1 bit as defined in clause 16.3 of [5, TS 38.213].
 - Cast type indicator – 2 bits as defined in Table 8.4.1.1-1.
 - CSI request – 1 bit as defined in clause 8.2.1 of [6, TS 38.214].

Table 8.4.1.1-1: Cast type indicator

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

8.4.1.2      SCI format 2-B
SCI format 2-B is used for the decoding of PSSCH, with HARQ operation when HARQ-ACK information includes only NACK, or when there is no feedback of HARQ-ACK information.
The following information is transmitted by means of the SCI format 2-B:
 - HARQ process number – 4 bits as defined in clause 16.4 of [5, TS 38.213].
 - New data indicator – 1 bit as defined in clause 16.4 of [5, TS 38.213].
 - Redundancy version – 2 bits as defined in clause 16.4 of [6, TS 38.214].
 - Source ID – 8 bits as defined in clause 8.1 of [6, TS 38.214].
 - Destination ID – 16 bits as defined in clause 8.1 of [6, TS 38.214].
 - HARQ feedback enabled/disabled indicator – 1 bit as defined in clause 16.3 of [5, TS 38.213].
 - Zone ID – 12 bits as defined in clause 5.8.11 of [9, TS 38.331].
 - Communication range requirement – 4 bits determined by higher layer parameter sl-ZoneConfigMCR-Index.

Referring to FIG. 9A or 9B, the first terminal may receive a PSFCH based on Table 7. For example, the first terminal and the second terminal may determine a PSFCH resource based on Table 7 and the second terminal may transmit HARQ feedback to the first terminal using the PSFCH resource.

TABLE 7

3GPP TS 38.213

16.3   UE procedure for reporting HARQ-ACK on sidelink
A UE can be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK.
A UE can be provided, by sl-PSFCH-Period-r16, a number of slots in a resource pool for a period of PSFCH transmission occasion resources. If the number is zero, PSFCH transmissions from the UE in the resource pool are disabled.
A UE expects that a slot $t'^{SL}_k$ ($0 \le k < T'_{max}$) has a PSFCH transmission occasion resource if k mod $N_{PSSCH}^{PSFCH} = 0$, where $t'^{SL}_k$ is defined in [6, TS 38.214], and $T'_{max}$ is a number of slots that belong to the resource pool within 10240 msec according to [6, TS 38.214], and $N_{PSSCH}^{PSFCH}$ is provided by sl-PSFCH-Period-r16.
A UE may be indicated by higher layers to not transmit a PSFCH in response to a PSSCH reception [11, TS 38.321].
If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

TABLE 7-continued

A UE is provided by sl-PSFCH-RB-Set-r16 a set of $M_{PRB,\,set}^{PSFCH}$ PRBs in a resource pool
for PSFCH transmission in a PRB of the resource pool. For a number of $N_{subch}$ sub-
channels for the resource pool, provided by sl-NumSubchannel, and a number of PSSCH
slots associated with a PSFCH slot that is less than or equal to $N_{PSSCH}^{PSFCH}$, the UE allocates
the $[(i + j \cdot N_{PSSCH}^{PSFCH}) \cdot M_{subch,\,slot}^{PSFCH}, (i + 1 + j \cdot N_{PSSCH}^{PSFCH}) \cdot M_{subch,\,slot}^{PSFCH} - 1]$ PRBs from the $M_{PRB,\,set}^{PSFCH}$
PRBs to slot i among the PSSCH slots associated with the PSFCH slot and sub-channel
j, where $M_{subch,\,slot}^{PSFCH} = M_{PRB,\,set}^{PSFCH}/(N_{subch} \cdot N_{PSSCH}^{PSFCH})$, $0 \le i < N_{PSSCH}^{PSFCH}$, $0 \le j \, N_{subch}$, and the
allocation starts in an ascending order of i and continues in an ascending order of j.
The UE expects that $M_{PRB,\,set}^{PSFCH}$ is a multiple of $N_{subch} \cdot N_{PSSCH}^{PSFCH}$.
A UE determines a number of PSFCH resources available for multiplexing HARQ-ACK
information in a PSFCH transmission as $R_{PRB,\,CS}^{PSFCH} = N_{type}^{PSFCH} \cdot M_{subch,\,slot}^{PSFCH} \cdot N_{CS}^{PSFCH}$ where
$N_{CS}^{PSFCH}$ is a number of cyclic shift pairs for the resource pool and, based on an indication
by higher layers,
- $N_{type}^{PSFCH} = 1$ and the $M_{subch,\,slot}^{PSFCH}$ PRBs are associated with the starting sub-channel
  of the corresponding PSSCH
- $N_{type}^{PSFCH} = N_{subch}^{PSSCH}$ and the $N_{subch}^{PSSCH} \cdot M_{subch,\,slot}^{PSFCH}$ PRBs are associated with one or more
  sub-channels from the $N_{subch}^{PSSCH}$ sub-channels of the corresponding PSSCH
The PSFCH resources are first indexed according to an ascending order of the PRB
index, from the $N_{type}^{PSFCH} \cdot M_{subch,\,slot}^{PSFCH}$ PRBs, and then according to an ascending order of
the cyclic shift pair index from the $N_{CS}^{PSFCH}$ cyclic shift pairs.
A UE determines an index of a PSFCH resource for a PSFCH transmission in response
to a PSSCH reception as $(P_{ID} + M_{ID}) \bmod R_{PRB,\,CS}^{PSFCH}$ where $P_{ID}$ is a physical layer source ID
provided by SCI format 2-A or 2-B [5, TS 38.212] scheduling the PSSCH reception,
and $M_{ID}$ is the identity of the UE receiving the PSSCH as indicated by higher layers if
the UE detects a SCI format 2-A with Cast type indicator field value of "01"; otherwise,
$M_{ID}$ is zero.
A UE determines a $m_0$ value, for computing a value of cyclic shift α [4, TS 38.211],
from a cyclic shift pair index corresponding to a PSFCH resource index and from $N_{CS}^{PSFCH}$
using Table 16.3-1.

Table 16.3-1: Set of cyclic shift pairs

| | $m_0$ | | | | | |
|---|---|---|---|---|---|---|
| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift α [4, TS 38.211], as
in Table 16.3-2 if the UE detects a SCI format 2-A with Cast type indicator field value
of "01" or "10", or as in Table 16.3-3 if the UE detects a SCI format 2-B or a SCI format
2-A with Cast type indicator field value of "11". The UE applies one cyclic shift from a
cyclic shift pair to a sequence used for the PSFCH transmission [4, TS 38.211].

Table 16.3-2: Mapping of HARQ-ACK information bit values to a cyclic shift, from a
cyclic shift pair, of a sequence for a PSFCH transmission when HARQ-ACK information
includes ACK or NACK

| HARQ-ACK Value | 0 (NACK) | 1 (ACK) |
|---|---|---|
| Sequence cyclic shift | 0 | 6 |

Table 16.3-3: Mapping of HARQ-ACK information bit values to a cyclic shift, from a
cyclic shift pair, of a sequence for a PSFCH transmission when HARQ-ACK information
includes only NACK

| HARQ-ACK Value | 0 (NACK) | 1 (ACK) |
|---|---|---|
| Sequence cyclic shift | 0 | N/A |

Referring to FIG. 9A, the first terminal may transmit SL HARQ feedback to the base station through the PUCCH and/or the PUSCH based on Table 8.

TABLE 8

3GPP TS 38.213

16.5 UE procedure for reporting HARQ-ACK on uplink
A UE can be provided PUCCH resources or PUSCH resources [12, TS 38.331] to report
HARQ-ACK information that the UE generates based on HARQ-ACK information that the
UE obtains from PSFCH receptions, or from absence of PSFCH receptions. The UE TABLE 8-continued reports HARQ-ACK information on the primary cell of the PUCCH group, as described in Clause 9, of the cell where the UE monitors PDCCH for detection of DCI format 3_0.
For SL configured grant Type 1 or Type 2 PSSCH transmissions by a UE within a time period provided by sl-PeriodCG, the UE generates one HARQ-ACK information bit in response to the PSFCH receptions to multiplex in a PUCCH transmission occasion that is after a last time resource, in a set of time resources.
For PSSCH transmissions scheduled by a DCI format 3_0, a UE generates HARQ-ACK information in response to PSFCH receptions to multiplex in a PUCCH transmission occasion that is after a last time resource in a set of time resources provided by the DCI format 3_0.
For each PSFCH reception occasion, from a number of PSFCH reception occasions, the UE generates HARQ-ACK information to report in a PUCCH or PUSCH transmission. The UE can be indicated by a SCI format to perform one of the following and the UE constructs a HARQ-ACK codeword with HARQ-ACK information, when applicable
  - if the UE receives a PSFCH associated with a SCI format 2-A with Cast type indicator field value of "10"
    - generate HARQ-ACK information with same value as a value of HARQ-ACK information the UE determines from a PSFCH reception in the PSFCH reception occasion and, if the UE determines that a PSFCH is not received at the PSFCH reception occasion, generate NACK
  - if the UE receives a PSFCH associated with a SCI format 2-A with Cast type indicator field value of "01"
    - generate ACK if the UE determines ACK from at least one PSFCH reception occasion, from the number of PSFCH reception occasions, in PSFCH resources corresponding to every identity $M_{ID}$ of the UEs that the UE expects to receive the PSSCH, as described in Clause 16.3; otherwise, generate NACK
  - if the UE receives a PSFCH associated with a SCI format 2-B or a SCI format 2-A with Cast type indicator field value of "11"
    - generate ACK when the UE determines absence of PSFCH reception for each PSFCH reception occasion from the number of PSFCH reception occasions; otherwise, generate NACK
After a UE transmits PSSCHs and receives PSFCHs in corresponding PSFCH resource occasions, the priority value of HARQ-ACK information is same as the priority value of the PSSCH transmissions that is associated with the PSFCH reception occasions providing the HARQ-ACK information.
The UE generates a NACK when, due to prioritization, as described in Clause 16.2.4, the UE does not receive PSFCH in any PSFCH reception occasion associated with a PSSCH transmission in a resource provided by a DCI format 3_0 with CRC scrambled by a SL-RNTI or, for a configured grant, in a resource provided in a single period and for which the UE is provided a PUCCH resource to report HARQ-ACK information. The priority value of the NACK is same as the priority value of the PSSCH transmission.
The UE generates a NACK when, due to prioritization as described in Clause 16.2.4, the UE does not transmit a PSSCH in any of the resources provided by a DCI format 3_0 with CRC scrambled by SL-RNTI or, for a configured grant, in any of the resources provided in a single period and for which the UE is provided a PUCCH resource to report HARQ-ACK information. The priority value of the NACK is same as the priority value of the PSSCH that was not transmitted due to prioritization.
The UE generates an ACK if the UE does not transmit a PSCCH with a SCI format 1-A scheduling a PSSCH in any of the resources provided by a configured grant in a single period and for which the UE is provided a PUCCH resource to report HARQ-ACK information. The priority value of the ACK is same as the largest priority value among the possible priority values for the configured grant.
A UE does not expect to be provided PUCCH resources or PUSCH resources to report HARQ-ACK information that start earlier than $(N + 1) \cdot (2048 + 144) \cdot \kappa \cdot 2^\mu \cdot T_c$ after the end of a last symbol of a last PSFCH reception occasion, from a number of PSFCH reception occasions that the UE generates HARQ-ACK information to report in a PUCCH or PUSCH transmission, where
  - $\kappa$ and $T_c$ are defined in [4, TS 38.211]
  - $\mu = \min(\mu_{SL}, \mu_{UL})$, where $\mu_{SL}$ is the SCS configuration of the SL BWP and $\mu_{UL}$ is the SCS configuration of the active UL BWP on the primary cell
  - N is determined from $\mu$ according to Table 16.5-1

Table 16.5-1: Values of N

| $\mu$ | N |
| --- | --- |
| 0 | 14 |
| 1 | 18 |
| 2 | 28 |
| 3 | 32 |

With reference to slots for PUCCH transmissions and for a number of PSFCH reception occasions ending in slot n, the UE provides the generated HARQ-ACK information in a PUCCH transmission within slot n + k, subject to the overlapping conditions in Clause 9.2.5, where k is a number of slots indicated by a PSFCH-to-HARQ_feedback timing indicator field, if present, in a DCI format indicating a slot for PUCCH transmission to report the HARQ-ACK information, or k is provided by sl-PSFCH-ToPUCCH-CG-Type1-r16. k = 0 corresponds to a last slot for a PUCCH transmission that would overlap with the last PSFCH reception occasion assuming that the start of the sidelink frame is same as the start of the downlink frame [4, TS 38.211].

TABLE 8-continued

For a PSSCH transmission by a UE that is scheduled by a DCI format, or for a SL configured grant Type 2 PSSCH transmission activated by a DCI format, the DCI format indicates to the UE that a PUCCH resource is not provided when a value of the PUCCH resource indicator field is zero and a value of PSFCH-to-HARQ feedback timing indicator field, if present, is zero. For a SL configured grant Type 1 PSSCH transmission, a PUCCH resource can be provided by sl-N1PUCCH-AN-r16 and sl-PSFCH-ToPUCCH-CG-Type1-r16. If a PUCCH resource is not provided, the UE does not transmit a PUCCH with generated HARQ-ACK information from PSFCH reception occasions.
For a PUCCH transmission with HARQ-ACK information, a UE determines a PUCCH resource after determining a set of PUCCH resources for $o_{UCI}$ HARQ-ACK information bits, as described in Clause 9.2.1. The PUCCH resource determination is based on a PUCCH resource indicator field [5, TS 38.212] in a last DCI format 3_0, among the DCI formats 3_0 that have a value of a PSFCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats are indexed in an ascending order across PDCCH monitoring occasion indexes.
A UE does not expect to multiplex HARQ-ACK information for more than one SL configured grants in a same PUCCH.
A priority value of a PUCCH transmission with one or more sidelink HARQ-ACK information bits is the smallest priority value for the one or more HARQ-ACK information bits.
In the following, the CRC for DCI format 3_0 is scrambled with a SL-RNTI or a SL-CS-RNTI.

Figure 10A:
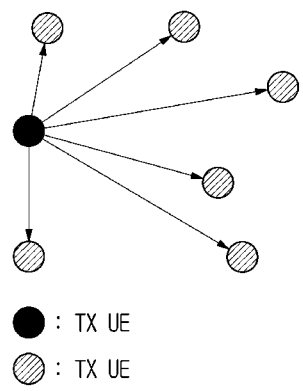
FIGS. 10A to 10C illustrate three cast types applicable to the present disclosure.
Figure 10B:
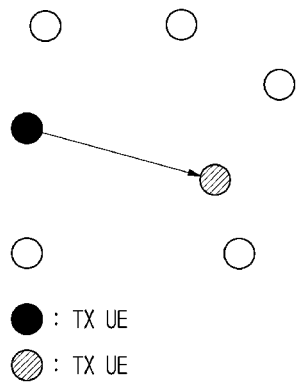
Figure 10C:
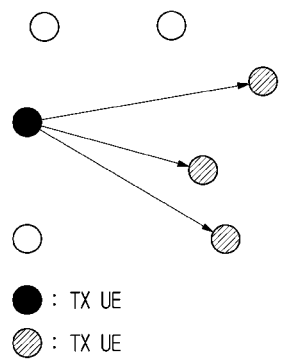

FIGS. 10A to 10C illustrate three cast types applicable to the present disclosure. The embodiment of FIGS. 10A to 10C may be combined with various embodiments of the present disclosure. Specifically, FIG. 10A exemplifies broadcast-type SL communication, FIG. 10B exemplifies unicast type-SL communication, and FIG. 10C exemplifies groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hybrid Automatic Request (Harq) Procedure

SL HARQ feedback may be enabled for unicast. In this case, in a non-code block group (non-CBG) operation, when the receiving UE decodes a PSCCH directed to it and succeeds in decoding an RB related to the PSCCH, the receiving UE may generate an HARQ-ACK and transmit the HARQ-ACK to the transmitting UE. On the other hand, after the receiving UE decodes the PSCCH directed to it and fails in decoding the TB related to the PSCCH, the receiving UE may generate an HARQ-NACK and transmit the HARQ-NACK to the transmitting UE.

For example, SL HARQ feedback may be enabled for groupcast. For example, in a non-CBG operation, two HARQ feedback options may be supported for groupcast.

(1) Groupcast option 1: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may not transmit an HARQ-ACK to the transmitting UE.

(2) Groupcast option 2: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may transmit an HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

In this specification, HARQ-ACK may be referred to as ACK, ACK information or positive-ACK information, and HARQ-NACK may be referred to as NACK, NACK information or negative-ACK information.

SL Measurement and Reporting

For the purpose of QoS prediction, initial transmission parameter setting, link adaptation, link management, admission control, and so on, SL measurement and reporting (e.g., an RSRP or an RSRQ) between UEs may be considered in SL. For example, the receiving UE may receive an RS from the transmitting UE and measure the channel state of the transmitting UE based on the RS. Further, the receiving UE may report CSI to the transmitting UE. SL-related measurement and reporting may include measurement and reporting of a CBR and reporting of location information. Examples of CSI for V2X include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and the like. CSI reporting may be activated and deactivated depending on a configuration.

For example, the transmitting UE may transmit a channel state information-reference signal (CSI-RS) to the receiving UE, and the receiving UE may measure a CQI or RI using the CSI-RS. For example, the CSI-RS may be referred to as an SL CSI-RS. For example, the CSI-RS may be confined to PSSCH transmission. For example, the transmitting UE may transmit the CSI-RS in PSSCH resources to the receiving UE.

Sidelink Congestion Control

For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

Figure 11:
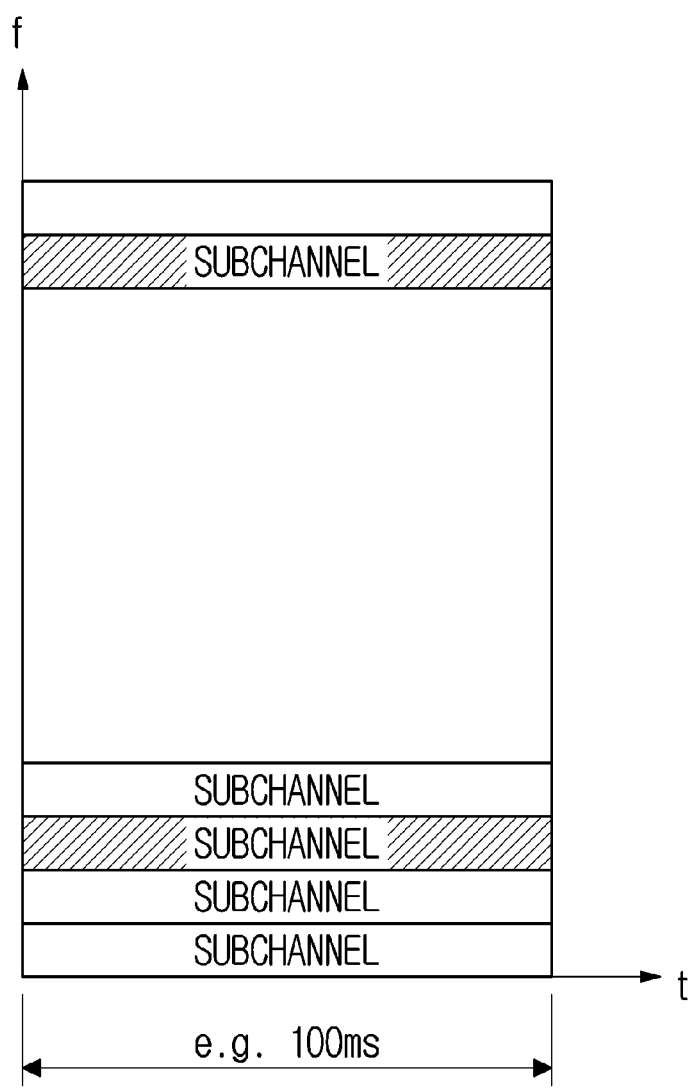
FIG. 11 illustrates a resource unit for channel busy ratio (CBR) measurement, applicable to the present disclosure.

FIG. 11 illustrates resource units for CBR measurement applicable to the present disclosure. The embodiment of FIG. 11 may be combined with various embodiments of the present disclosure.

Referring to FIG. 11, a CBR may refer to the number of subchannels of which the RS SI measurements are equal to or larger than a predetermined threshold as a result of measuring an RSSI in each subchannel during a specific period (e.g., 100 ms) by a UE. Alternatively, a CBR may refer to a ratio of subchannels having values equal to or greater than a predetermined threshold among subchannels during a specific period. For example, in the embodiment of FIG. 11, on the assumption that the hatched subchannels have values greater than or equal to a predetermined threshold, the CBR may refer to a ratio of hatched subchannels for a time period of 100 ms. In addition, the UE may report the CBR to the BS.

For example, when a PSCCH and a PSSCH are multiplexed in a frequency domain, the UE may perform one CBR measurement in one resource pool. When PSFCH resources are configured or preconfigured, the PSFCH resources may be excluded from the CBR measurement.

Further, there may be a need for performing congestion control in consideration of the priority of traffic (e.g., a packet). To this end, for example, the UE may measure a channel occupancy ratio (CR). Specifically, the UE may measure a CBR and determine a maximum value CRlimitk of a CR k (CRk) available for traffic corresponding to each priority (e.g., k) according to the CBR. For example, the UE may derive the maximum value CRlimitk of the channel occupancy ratio for the priority of traffic, based on a predetermined table of CBR measurements. For example, for relatively high-priority traffic, the UE may derive a relatively large maximum value of a channel occupancy ratio. Thereafter, the UE may perform congestion control by limiting the sum of the channel occupancy ratios of traffic with priorities k lower than i to a predetermined value or less. According to this method, a stricter channel occupancy ratio limit may be imposed on relatively low-priority traffic.

Besides, the UE may perform SL congestion control by using a scheme such as transmission power adjustment, packet dropping, determination as to whether to retransmit, and adjustment of a transmission RB size (MCS adjustment).

An example of SL CBR and SL RSSI is as follows. In the description below, a slot index may be based on a physical slot index.

SL CBR measured in a slot n is defined as portion of subchannels in which SL RSSI measured by a UE within a resource pool, sensed over CBR measurement window [n−a, n−1], exceeds a (pre)set threshold. Here, according to a higher layer parameter timeWindowSize-CBR, a is equal to 100 or $100 \cdot 2^\mu$ slots. SL CBR may be applied to RRC_IDLE intra-frequency, RRC_IDLE inter-frequency, RRC_CONNECTED intra-frequency and RRC_CONNECTED inter-frequency.

SL RSSI is defined as a linear average of a total receive power ([W] unit) observed in a configured subchannel in OFDM symbols of a slot configured for a PSCCH and a PSSCH starting from a second OFDM symbol. For FR1, a reference point for SL RSSI shall be an antenna connector of a UE. For FR2, SL RSSI shall be measured based on a combined signal from antenna elements corresponding to a given receiver branch. For FR1 and FR2, if receive diversity is used by a UE, a reported SL RSSI value shall not be less than corresponding SL RSSI of any of individual receiver branches. SL RSSI may be applied to RRC_IDLE intra-frequency, RRC_IDLE inter-frequency, RRC_CONNECTED intra-frequency and RRC_CONNECTED inter-frequency.

An example of an SL CR (Channel occupancy Ratio) is as follows. The SL CR evaluated in a slot n is defined as dividing a total number of subchannels used for transmission in slot [n−a, n−1] and granted in slot [n, n+b] by a total number of subchannels configured in a transmission pool over slot [n−a, n+b]. SL CR may be applied to RRC_IDLE intra-frequency, RRC_IDLE inter-frequency, RRC_CONNECTED intra-frequency and RRC_CONNECTED inter-frequency. Here, a may be a positive integer and b may be 0 or a may be a positive integer. a and b is determined by UE implementation, and $a+b+1=1000$ or $a+b+1=1000 \cdot 2^\mu$ according to higher layer parameter timeWindowSize-CBR. $b<(a+b+1)/2$ and n+b shall not exceed a last transmission opportunity of a grant for current transmission. SL CR is evaluated for each (re)transmission. In evaluating SL CR, according to grant(s) present in slot [n+1, n+b] without packet dropping, a UE shall assume that a transmission parameter used in slot n is reused. A slot index may be a physical slot index. SL CR may be calculated per priority level. If it is a member of a sidelink grant defined in TS 38.321, the resource is treated as granted.

Positioning

Figure 12:
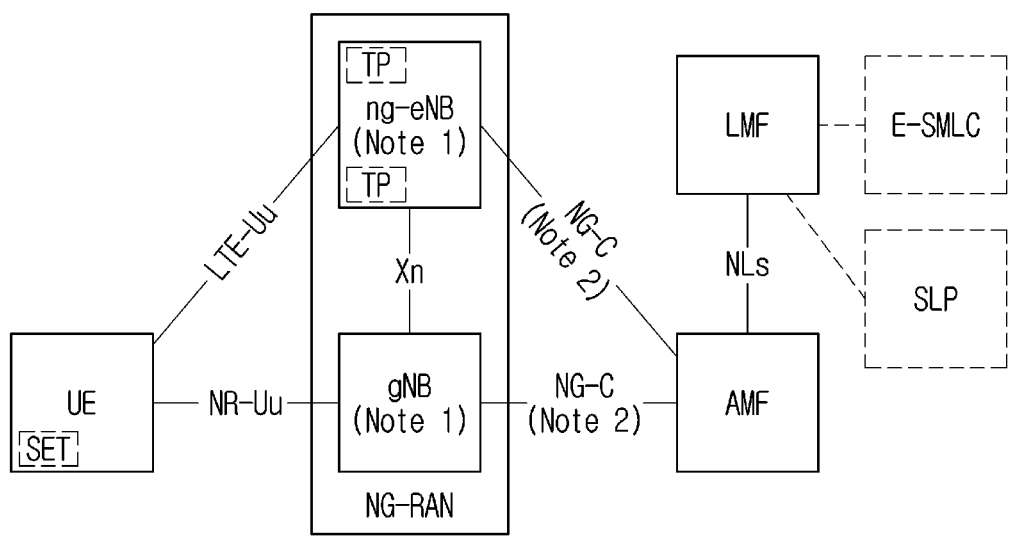
FIG. 12 illustrates an example of an architecture in a 5G system, for positioning a UE which has accessed an NG-RAN or an evolved UMTS terrestrial radio access network (E-UTRAN) applicable to the present disclosure.

FIG. 12 illustrates an example of an architecture of a 5G system capable of positioning a UE connected to an NG-RAN or an E-UTRAN applicable to the present disclosure.

Referring to FIG. 12, an AMF may receive a request for a location service related to a specific target UE from another entity such as a gateway mobile location center (GMLC) or may autonomously determine to initiate the location service on behalf of the specific target UE. The AMF may then transmit a location service request to a location management function (LMF). Upon receipt of the location service request, the LMF may process the location service request and return a processing result including information about an estimated location of the UE to the AMF. On the other hand, when the location service request is received from another entity such as the GMLC, the AMF may deliver the processing result received from the LMF to the other entity.

A new generation evolved-NB (ng-eNB) and a gNB, which are network elements of an NG-RAN capable of providing measurement results for positioning, may measure radio signals for the target UE and transmit result values to the LMF. The ng-eNB may also control some transmission points (TPs) such as remote radio heads or positioning reference signal (PRS)-dedicated TPs supporting a PRS-based beacon system for an E-UTRA.

The LMF is connected to an enhanced serving mobile location center (E-SMLC), and the E-SMLC may enable the LMF to access an E-UTRAN. For example, the E-SMLC may enable the LMF to support observed time difference of arrival (OTDOA), which is one of positioning methods in the E-UTRAN, by using DL measurements obtained by the target UE through signals transmitted by the eNB and/or the PRS-dedicated TPs in the E-UTRAN.

The LMF may be connected to an SUPL location platform (SLP). The LMF may support and manage different location determination services for target UEs. The LMF may interact with the serving ng-eNB or serving gNB of a target UE to obtain a location measurement of the UE. For positioning the target UE, the LMF may determine a positioning method based on a location service (LCS) client type, a QoS requirement, UE positioning capabilities, gNB positioning capabilities, and ng-eNB positioning capabilities, and apply the positioning method to the serving gNB and/or the serving ng-eNB. The LMF may determine additional information such as a location estimate for the target UE and the accuracy of the position estimation and a speed. The SLP is a secure user plane location (SUPL) entity responsible for positioning through the user plane.

The UE may measure a DL signal through sources such as the NG-RAN and E-UTRAN, different global navigation satellite systems (GNSSes), a terrestrial beacon system (TBS), a wireless local area network (WLAN) access point, a Bluetooth beacon, and a UE barometric pressure sensor. The UE may include an LCS application and access the LCS application through communication with a network to which the UE is connected or through another application included in the UE. The LCS application may include a measurement and calculation function required to determine the location of the UE. For example, the UE may include an independent positioning function such as a global positioning system (GPS) and report the location of the UE independently of an NG-RAN transmission. The independently obtained positioning information may be utilized as auxiliary information of positioning information obtained from the network.

Figure 13:
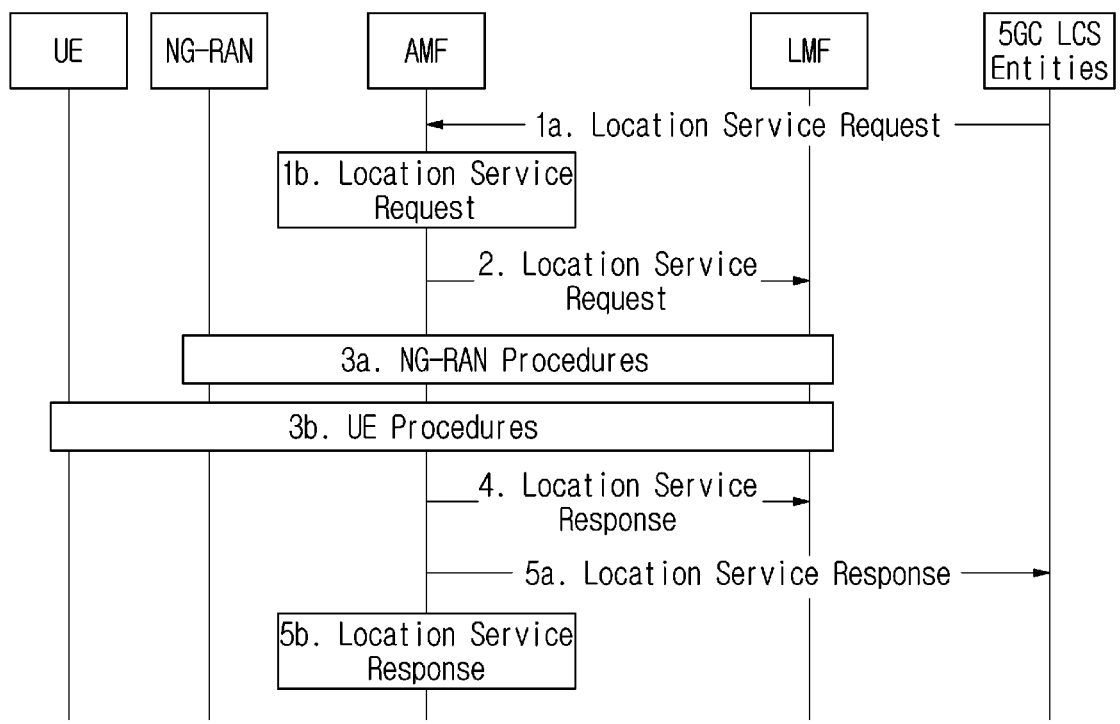
FIG. 13 illustrates an implementation example of a network for positioning a UE applicable to the present disclosure.

FIG. 13 illustrates exemplary implementation of a network for positioning a UE applicable to the present disclosure.

Upon receipt of a location service request when the UE is in a connection management—IDLE (CM-IDLE) state, the AMF may establish a signaling connection with the UE and request a network trigger service to assign a specific serving gNB or ng-eNB. This operation is not shown in FIG. 13. That is, FIG. 13 may be based on the assumption that the UE is in connected mode. However, the signaling connection may be released by the NG-RAN due to signaling and data deactivation during positioning.

Referring to FIG. 13, a network operation for positioning a UE will be described in detail. In step 1a, a 5GC entity such as a GMLC may request a location service for positioning a target UE to a serving AMF. However, even though the GMLC does not request the location service, the serving AMF may determine that the location service for positioning the target UE is required in step 1b. For example, for positioning the UE for an emergency call, the serving AMF may determine to perform the location service directly.

The AMF may then transmit a location service request to an LMF in step 2, and the LMF may start location procedures with the serving-eNB and the serving gNB to obtain positioning data or positioning assistance data in step 3a. Additionally, the LMF may initiate a location procedure for DL positioning with the UE in step 3b. For example, the LMF may transmit positioning assistance data (assistance data defined in 3GPP TS 36.355) to the UE, or obtain a location estimate or location measurement. Although step 3b may be additionally performed after step 3a, step 3b may be performed instead of step 3a.

In step 4, the LMF may provide a location service response to the AMF. The location service response may include information indicating whether location estimation of the UE was successful and the location estimate of the UE. Then, when the procedure of FIG. 13 is initiated in step 1a, the AMF may deliver the location service response to the 5GC entity such as the GMLC. When the procedure of FIG. 13 is initiated in step 1b, the AMF may use the location service response to provide the location service related to an emergency call or the like.

Figure 14:
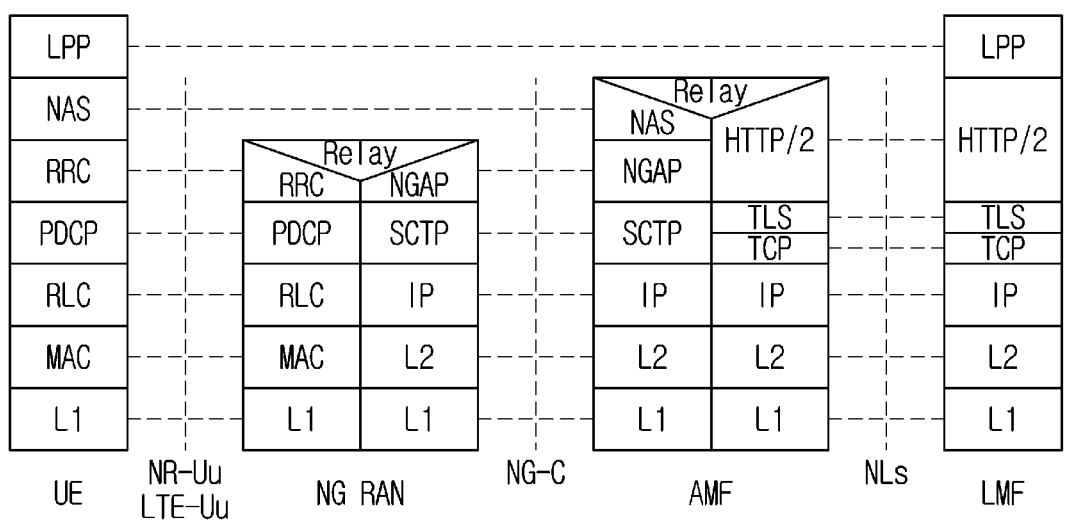
FIG. 14 illustrates exemplary protocol layers used to support LTE positioning protocol (LPP) message transmission between a location management function (LMF) and a UE applicable to the present disclosure.

FIG. 14 illustrates exemplary protocol layers used to support LTE positioning protocol (LPP) message transmission between an LMF and a UE applicable to the present disclosure.

An LPP PDU may be transmitted in a NAS PDU between the AMF and the UE. Referring to FIG. 14, the LPP may be terminated between a target device (e.g., a UE in the control plane or a SUPL enabled terminal (SET) in the user plane) and a location server (e.g., an LMF in the control plane or an SLP in the user plane). An LPP message may be transmitted in a transparent PDU over an intermediate network interface by using an appropriate protocol such as the NG application protocol (NGAP) via an NG-control plane (NG-C) interface or a NAS/RRC via LTE-Uu and NR-Uu interfaces. The LPP allows positioning for NR and LTE in various positioning methods.

For example, the target device and the location server may exchange capability information with each other, positioning assistance data and/or location information over the LPP. Further, error information may be exchanged and/or discontinuation of an LPP procedure may be indicated, by an LPP message.

Figure 15:
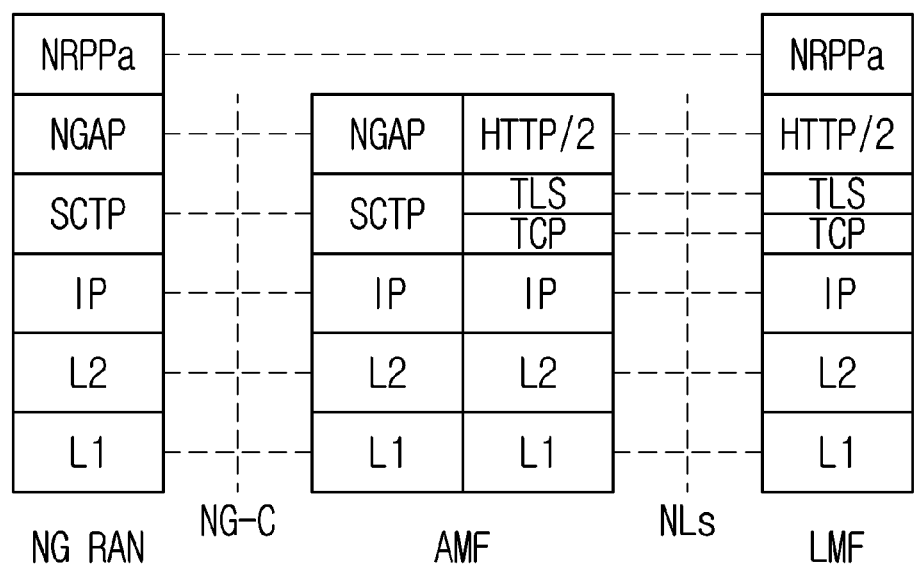
FIG. 15 illustrates exemplary protocol layers used to support NR positioning protocol A (NRPPa) protocol data unit (PDU) transmission between an LMF and an NG-RAN node applicable to the present disclosure.

FIG. 15 illustrates exemplary protocol layers used to support NR positioning protocol A (NRPPa) PDU transmission between an LMF and an NG-RAN node applicable to the present disclosure.

NRPPa may be used for information exchange between the NG-RAN node and the LMF. Specifically, NRPPa enables exchange of an enhanced-cell ID (E-CID) for a measurement transmitted from the ng-eNB to the LMF, data to support OTDOA positioning, and a Cell-ID and Cell location ID for NR Cell ID positioning. Even without information about a related NRPPa transaction, the AMF may route NRPPa PDUs based on the routing ID of the related LMF via an NG-C interface.

Procedures of the NRPPa protocol for positioning and data collection may be divided into two types. One of the two types is a UE-associated procedure for delivering information (e.g., positioning information) about a specific UE, and the other type is a non-UE-associated procedure for delivering information (e.g., gNB/ng-eNB/TP timing information) applicable to an NG-RAN node and related TPs. The two types of procedures may be supported independently or simultaneously.

Positioning methods supported by the NG-RAN include GNSS, OTDOA, E-CID, barometric pressure sensor positioning, WLAN positioning, Bluetooth positioning, terrestrial beacon system (TBS), and UL time difference of arrival (UTDOA). Although a UE may be positioned in any of the above positioning methods, two or more positioning methods may be used to position the UE.

(1) Observed Time Difference of Arrival (OTDOA)

Figure 16:
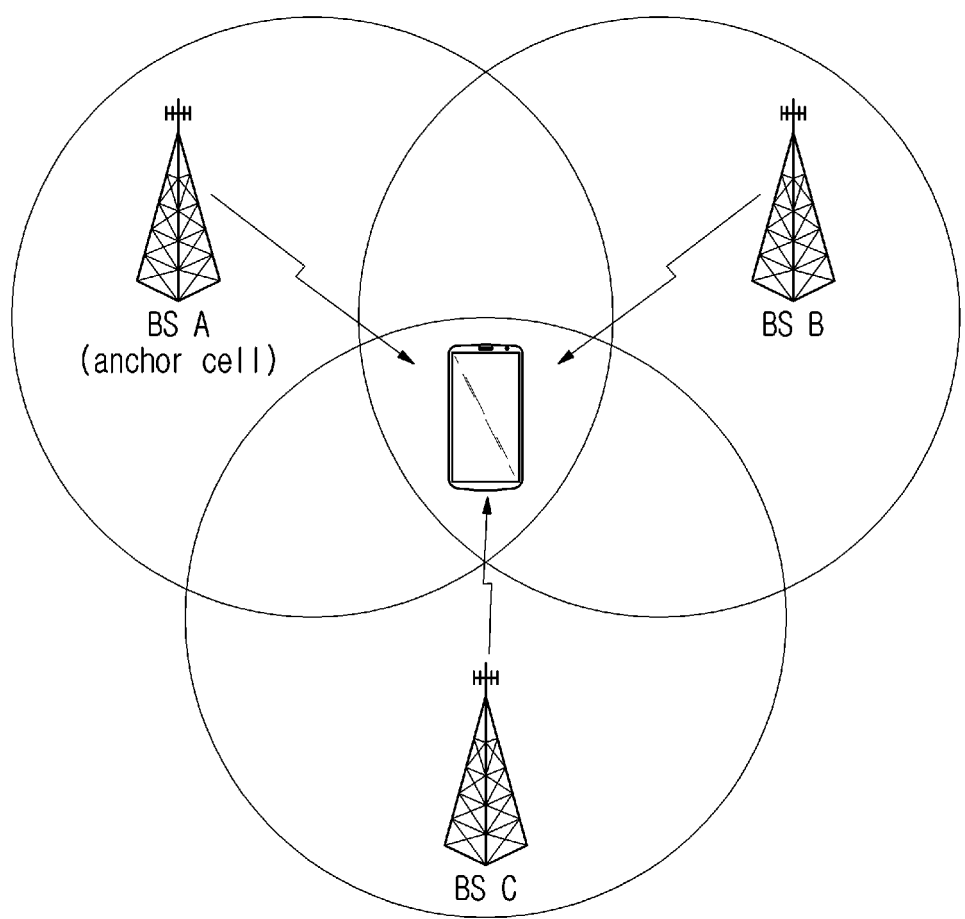
FIG. 16 illustrates an observed time difference of arrival (OTDOA) positioning method applicable to the present disclosure.

FIG. 16 is a diagram illustrating an OTDOA positioning method applicable to the present disclosure.

In the OTDOA positioning method, a UE utilizes measurement timings of DL signals received from multiple TPs including an eNB, ng-eNB, and a PRS-dedicated TP. The UE measures the timings of the received DL signals using positioning assistance data received from a location server. The location of the UE may be determined based on the measurement results and the geographical coordinates of neighboring TPs.

A UE connected to a gNB may request a measurement gap for OTDOA measurement from a TP. When the UE fails to identify a single frequency network (SFN) for at least one TP in OTDOA assistance data, the UE may use an autonomous gap to acquire the SFN of an OTDOA reference cell before requesting a measurement gap in which a reference signal time difference (RSTD) is measured.

Herein, an RSTD may be defined based on a smallest relative time difference between the boundaries of two subframes received from a reference cell and a measurement cell. That is, the RSTD may be calculated as a relative timing difference for between a time when the UE receives the start of a subframe from the reference cell and a time when the UE receives the start of a subframe from the measurement cell which is closest to the subframe received from the reference cell. The reference cell may be selected by the UE.

For accurate OTDOA measurement, it is necessary to measure the time of arrivals (TOAs) of signals received from three or more geographically distributed TPs or BSs. For example, TOAs for TP 1, TP 2, and TP 3 may be measured, an RSTD for TP 1-TP 2, an RSTD for TP 2-TP 3, and an RSTD for TP 3-TP 1 may be calculated based on the three TOAs, geometric hyperbolas may be determined based on the calculated RSTDs, and a point where these hyperbolas intersect may be estimated as the location of the UE. Accuracy and/or uncertainty may be involved in each TOA measurement, and thus the estimated UE location may be known as a specific range according to the measurement uncertainty.

For example, an RSTD for two TPs may be calculated by Equation 1.

$$RSTDi,1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 1]

where c is the speed of light, {xt, yt} is the (unknown) coordinates of the target UE, {xi, yi} is the coordinates of a (known) TP, and {x1, y1} is the coordinates of a reference TP (or another TP). (Ti−T1) is a transmission time offset between the two TPs, which may be referred to as "real time difference" (RTD), and ni and n1 may represent values related to UE TOA measurement errors.

(2) E-CID (Enhanced Cell ID)

In cell ID (CID) positioning, the location of a UE may be measured based on geographic information about the serving ng-eNB, serving gNB and/or serving cell of the UE. For example, the geographic information about the serving ng-eNB, the serving gNB, and/or the serving cell may be obtained by paging, registration, or the like.

For E-CID positioning, an additional UE measurement and/or NG-RAN radio resources may be used to improve a UE location estimate in addition to the CID positioning method. In the E-CID positioning method, although some of the same measurement methods as in the measurement control system of the RRC protocol may be used, an additional measurement is generally not performed only for positioning the UE. In other words, a separate measurement configuration or measurement control message may not be provided to position the UE, and the UE may also report a measured value obtained by generally available measurement methods, without expecting that an additional measurement operation only for positioning will be requested.

For example, the serving gNB may implement the E-CID positioning method using an E-UTRA measurement received from the UE.

Exemplary measurement elements that are available for E-CID positioning are given as follows.

UE measurements: E-UTRA RSRP, E-UTRA RSRQ, UE E-UTRA Rx-Tx time difference, GSM EDGE random access network (GERAN)/WLAN RSSI, UTRAN common pilot channel (CPICH) received signal code power (RSCP), and UTRAN CPICH EOM.

E-UTRAN measurements: ng-eNB Rx-Tx time difference, timing advance (TADV), and angle of arrival (AoA).

TADVs may be classified into Type 1 and Type 2 as follows.

TADV Type 1=(ng-eNB Rx-Tx time difference)+(UE E-UTRA Rx-Tx time difference)

TADV Type 2=ng-eNB Rx-Tx time difference

On the other hand, an AoA may be used to measure the direction of the UE. The AoA may be defined as an estimated angle of the UE with respect to the location of the UE counterclockwise from a BS/TP. A geographical reference direction may be North. The BS/TP may use a UL signal such as a sounding reference signal (SRS) and/or a DMRS for AoA measurement. As the arrangement of antenna arrays is larger, the measurement accuracy of the AoA is higher. When the antenna arrays are arranged at the same interval, signals received at adjacent antenna elements may have a constant phase change (phase rotation).

(3) UTDOA (UL Time Difference of Arrival)

A UTDOA is a method of determining the location of a UE by estimating the arrival time of an SRS. When the estimated SRS arrival time is calculated, a serving cell may be used as a reference cell to estimate the location of the UE based on the difference in arrival time from another cell (or BS/TP). In order to implement the UTDOA method, an E-SMLC may indicate the serving cell of a target UE to indicate SRS transmission to the target UE. Further, the E-SMLC may provide a configuration such as whether an SRS is periodic/aperiodic, a bandwidth, and frequency/group/sequence hopping.

IAB (Integrated Access and Backhaul) Technology

One of potential technologies for enabling feature cellular communication deployment scenarios and applications is to support backhaul and relay links. Backhaul and relay links enable flexible, very dense deployment of NR cells without the need to proportionally densify a transport network.

In addition to large-scale MIMO or multi-beam systems, due to available wide bandwidth expected in NR compared to LTE, NR may consider an integrated access and backhaul (IAB) link. This may facilitate deployment of a dense network of self-backhauled NR cells in a more integrated manner by setting it according to a control and data channel/procedure defined to provide access to the UE.

Figure 17:
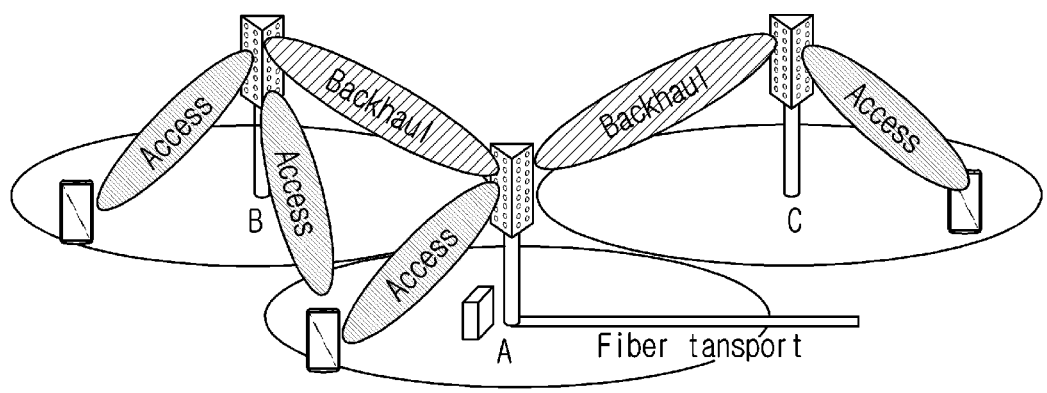
FIG. 17 illustrates an example of an integrated access and backhaul (IAB) link according to an embodiment of the present disclosure.

As an example, FIG. 17 shows an example of an IAB link, according to an embodiment of the present disclosure. Referring to FIG. 17, a relay node (e.g., rTRP (relay TRP)) may multiplex an access link and a backhaul link in time, frequency or space (e.g., beam-based operation). As an example, a service considering the following requirements based on the IAB may be provided.

Figure 18:
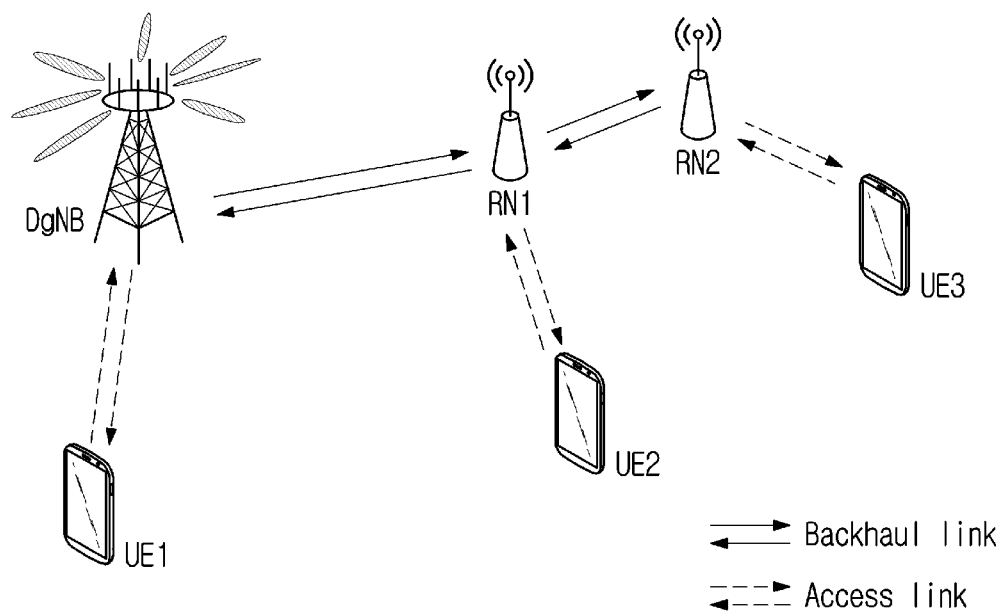
FIG. 18 illustrates another example of an IAB link according to an embodiment of the present disclosure.

Effective and flexible operation for in-band and out-band relay in indoor and outdoor scenarios
Multi-hop connectivity
End-to-end routing selection and optimization
Support of backhaul link with high space efficiency
Support for conventional UEs FIG. 18 illustrates another example of an IAB link according to an embodiment of the present disclosure. Referring to FIG. 18, a relay node 1 (RN1) is connected to a donor gNB (DgNB) and a relay node 2 (RN2) is connected to the relay node 1 through a wireless backhaul. That is, the donor gNB integrally provides a backhaul link for the relay node 1 and an access link for UE1, and the relay node 1 integrally provides a backhaul link for the relay node 2 and an access link for UE2.

Figure 19:
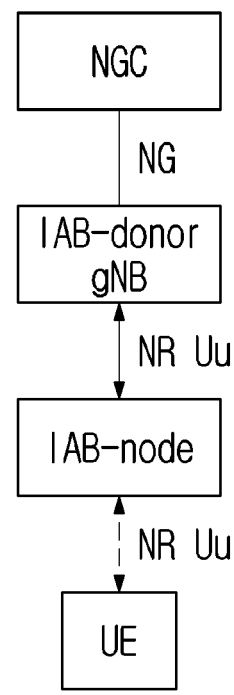
FIG. 19 illustrates examples of IAB structures in a stand-alone (SA) mode and a non-SA (NSA) mode according to an embodiment of the present disclosure.
Figure 20:
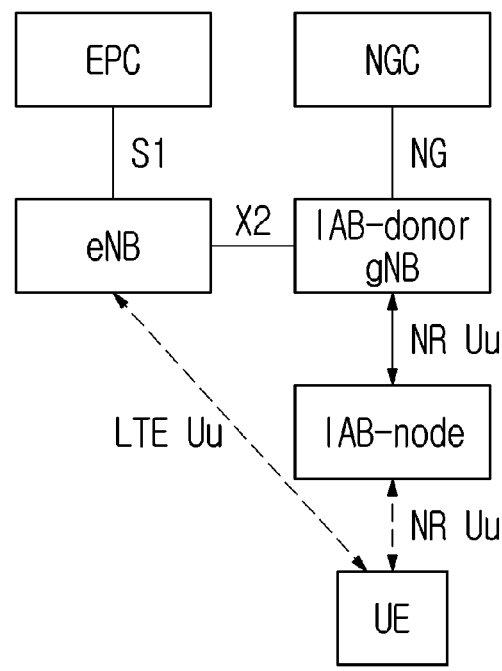
FIG. 20 illustrates examples of IAB structures in a stand-alone (SA) mode and a non-SA (NSA) mode according to an embodiment of the present disclosure.
Figure 21:
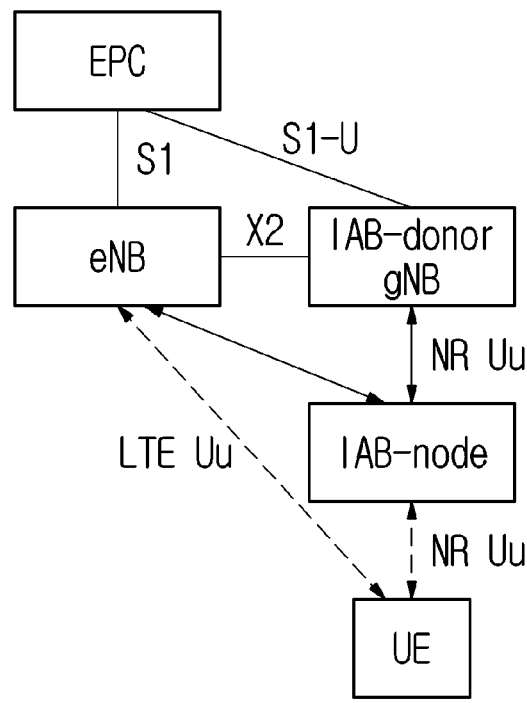
FIG. 21 illustrates examples of IAB structures in a stand-alone (SA) mode and a non-SA (NSA) mode according to an embodiment of the present disclosure.

FIGS. 19 to 21 illustrate examples of IAB structures in a standalone (SA) mode and a non-SA (NSA) mode according to an embodiment of the present disclosure. FIG. 19 illustrates a case where the UE operates in an SA mode, FIG. 20 illustrates a case where the UE operates in an NSA mode and the IAB node operates in an NGC mode, and FIG. 21 illustrates a case where the UE and the IAB node operate in the NSA mode.

Referring to FIGS. 19 to 21, the IAB node may operate in the SA mode or NAS mode. When operating in the NSA mode, the IAB node may only use the NR link for backhauling. The UE may be connected to more types of core networks than the IAB node.

Figure 22:
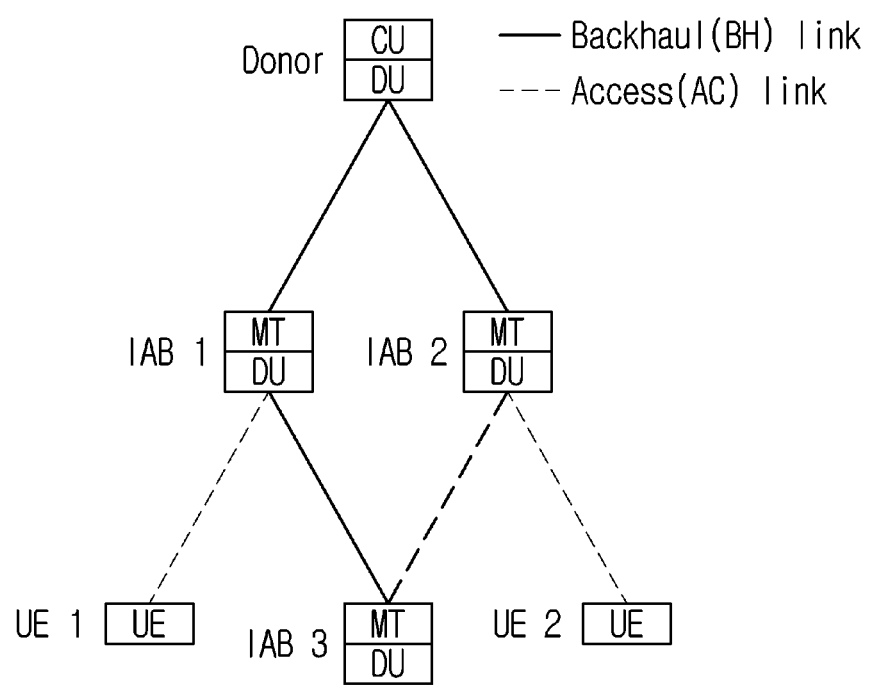
FIG. 22 illustrates a connection structure of an IAB node and an IAB donor according to an embodiment of the present disclosure.
Figure 23:
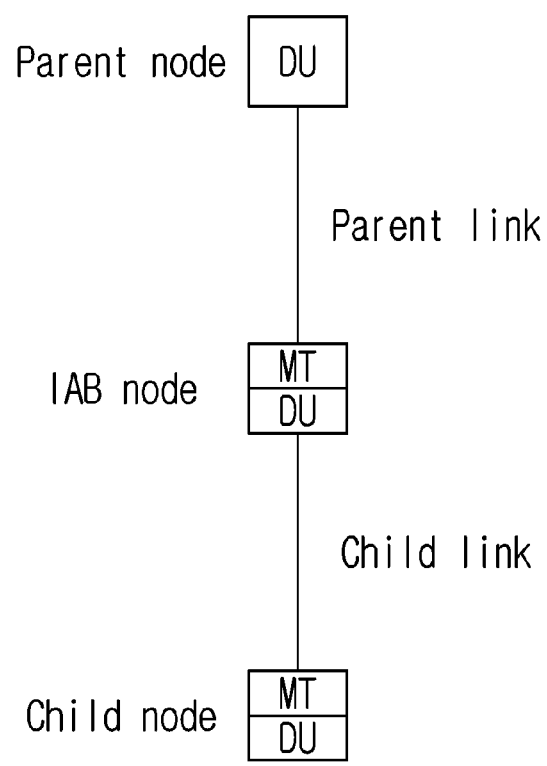
FIG. 23 illustrates a connection structure of an IAB node and an IAB donor according to an embodiment of the present disclosure.

FIGS. 22 and 23 illustrate a connection structure of an IAB node and an IAB donor according to an embodiment of the present disclosure. FIG. 22 illustrates a layer structure of nodes and FIG. 23 illustrates the concept of a parent node and a child node.

Referring to FIG. 22, a link between a donor node and an IAB node or a link between IAB nodes may be referred to as a backhaul link. A link between a donor node and a UE or a link between an IAB node and a UE may be referred to as an access link. That is, the access link may be a link for connection with the UE, and the backhaul link may be a link for connection between non-UE nodes (e.g., an IAB node, an IAB donor, a base station). Here, the IAB node includes a mobile terminal (MT) and a distributed unit (DU), where the MT is a component for connection with an upper node, and the DU is a component for connection with a lower node. IAB donors include DUs and central units (CUs). A CN is a component for connection with the core network.

Referring to FIG. 23, from the standpoint of one IAB node, a lower node connected through a DU is a child node, and a link with a child node is a child link. In addition, an upper node connected through the MT is a parent node, and a link with the parent node is a parent link.

A terminal connected to the IAB node may perform uplink communication and downlink communication through the IAB node. The uplink data transmitted by the terminal is transmitted from the IAB node to the IAB donor through at least one wireless backhaul link, and is processed through the CU of the IAB donor. Downlink data directed to the terminal is transmitted from the IAB donor to the IAB node through at least one wireless backhaul link, and is transmitted to the terminal by the DU of the IAB donor.

The IAB node may perform an initial access procedure similar to the UE, such as cell search, system information acquisition, random access, etc., in order to initially establish a connection to a parent IAB node or an IAB donor. SSB/CSI-RS based on RRM measurement is a starting point of IAB discovery and measurement.

Downlink IAB node transmission (e.g., transmission on the backhaul link from the IAB node to the child IAB node, transmission on the access link from the IAB node to the UE) may be scheduled by the IAB node. Uplink IAB transmission (e.g., transmission on the backhaul link from the IAB node to the parent IAB node or the IAB donor) is scheduled by the parent IAB node or IAB donor.

Specific Embodiments of the Present Disclosure

A data local routing method for sidelink communication will be described based on the above-described IAB. As an example, hereinafter, for convenience of description, a subject performing communication based on a sidelink or V2X (Vehicle-to-Everything) is referred to as a terminal. For example, the terminal may be a vehicle and other devices, and may not be limited to a specific form. For example, the terminal may perform communication by establishing an infrastructure based on a network and an IAB (Integrated Access and Backhaul).

As a specific example, communication between the terminal and the network may be a V2N (Vehicle-to-Network) communication service. In this case, the sidelink service may be communication between terminals located mainly within a local range.

However, as described above, in the case of IAB, after data for communication is delivered to a core network (or IAB donor) through an IAB node, the data is transmitted to the corresponding IAB node or a neighboring IAB node again, thereby finally performing communication. That is, the existing IAB node could only provide a relay function between the terminal and the IAB donor, between which a link was established, and could not directly process data. Therefore, even in sidelink communication, when the terminal transmits data to another terminal through the IAB node, the data may be transmitted from the terminal to the IAB donor via the IAB node and then data is transmitted from the IAB donor to another terminal through the IAB node, thereby resulting in latency in data transmission.

However, low-latency service may be required for communication between terminals of a new communication system, and, when the service is received using the IAB-based infrastructure, since the data is delivered to the core network and then delivered to the IAB node, there may be a limit in satisfying requirements for low latency. For example, in the case of sidelink communication, requirements for low latency may be set for communication between terminals, but, when the number of connections between an IAB donor and an IAB node increases, a problem that the above-described requirements are not satisfied may occur.

In consideration of the above, the IAB node needs to perform data transmission to neighboring sidelink terminals without transmitting data to the core network based on the data local routing technique, which will be described later. As an example, the following may be configured as portion of a new communication system (e.g. NR). As another example, the following may be configured as portion of an independent infrastructure such as a road side unit (RSU) for a special service such as V2X, and may not be limited to a specific form.

When data local routing is provided based on the IAB node, communication satisfying low-latency requirements while ensuring terminal-to-terminal (or Vehicle-to-Vehicle, V2X) communication coverage may be performed. For example, when a radio wave is blocked based on an obstacle in terminal-to-terminal communication, terminal-to-terminal communication may secure communication coverage based on local routing of an IAB node, and a detailed method for this will be described below.

As an example, a PDU (Protocol Data Unit) session may be set up between the terminal and the IAB donor. Here, the IAB node may use a radio bearer configured for the V2X service through the PDU session between the terminal and the IAB donor. In addition, the IAB node may have a local routing function, and the IAB node may directly receive messages from terminals accessing the IAB node. At this time, as an example, in the IAB node, "V2X-BHLocalRouteList" for the V2X message delivery range between IAB nodes may be configured by the IAB donor, and the procedure for configuring "V2X-BHLocalRouteList" will be described later.

In addition, the node may be provided with a PDCP (Packet Data Convergence Protocol) sublayer function for V2X messages for local routing. The PDCP sublayer of the IAB node may receive PDCP configuration information of the accessing terminals from the IAB donor, and a procedure for this will be described later.

In addition, as an example, the IAB node may perform a procedure for configuring radio bearer mapping information with the accessing terminal for the V2X service, which will be described later. As another example, the IAB node may have a Backhaul Adaptation Protocol (BAP) entity function. As an example, the protocol structure of the IAB may be divided in the RLC (Radio Link Control) layer. In this case, the BAP layer may be in charge of routing and RLC channel mapping functions for multi-hop-based relay transmission. For example, data transmission may be performed between IAB nodes based on a BAP layer.

The IAB node may operate based on the above, and the IAB node may transmit a local routing message to the terminals accessing the corresponding IAB node or neighboring IAB nodes through local routing for the V2X message transmitted by the terminal. That is, by delivering the sidelink data generated in the terminal to another terminal using the IAB node, data transmission may be possible even when direct communication between terminals is impossible due to an obstacle. Here, the sidelink data is not delivered to the IAB donor, but is transmitted to other terminals through the IAB node, so that latency may be reduced.

In addition, as an example, message transmission may be performed by extending to another IAB node connected to the IAB donor in the IAB system. That is, the transmission/reception range of sidelink data of the terminal may be extended based on the IAB node.

As an example, data transmission/reception latency requirements of the terminal in sidelink communication (or V2X communication) may be 100 ms or less. Here, the above-described latency requirements may be satisfied by the IAB node transmitting the data generated in the terminal to another terminal through local routing without delivering the data to the IAB donor.

Figure 24:
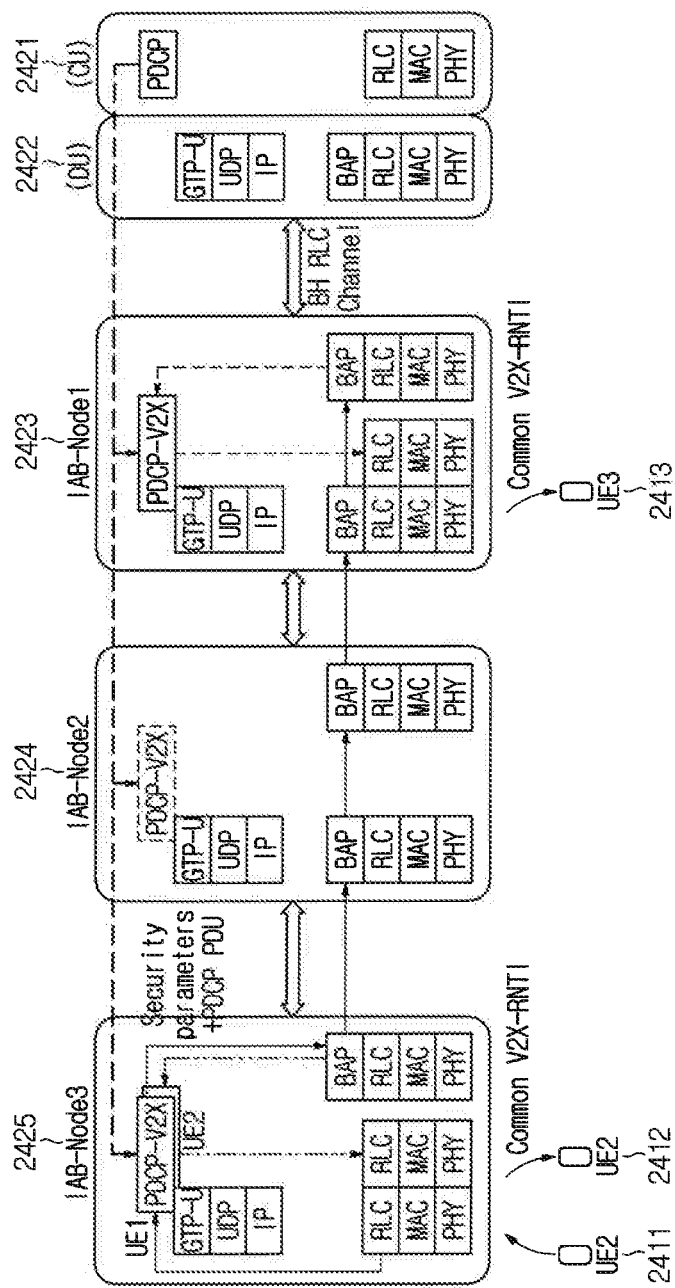
FIG. 24 illustrates a method of performing local routing based on an IAB node according to an embodiment of the present disclosure.

FIG. 24 illustrates a method of performing local routing based on an IAB node according to an embodiment of the present disclosure.

Referring to FIG. 24, a case where Terminal 1 (UE 1) 2411 transmits a V2X message to another terminal may be considered. In this case, as an example, the V2X message may refer to data or information delivered based on terminal-to-terminal communication and may not be limited to specific information. However, it may be referred to as a V2X message for convenience of description, but may not be limited thereto.

As an example, in each of the IAB nodes 2423, 2424 and 2425, a Next Hop and Destination IAB address may be configured to deliver a V2X message to an adjacent IAB node, as shown in Table 9 below. That is, in each of the IAB nodes 2423, 2424 and 2425, Next Hop information, which is information on an IAB node adjacent thereto, may be configured. In addition, as an example, in each of the IAB nodes 2423, 2424, and 2425, address information of a destination IAB to which data is delivered based on a relay function may be configured, and, through this, data relay may be possible.

TABLE 9

| V2X-BHLocalRouteList at IAB-node3 | | |
|---|---|---|
| Reverse | | Forward |
| IAB-node 5 | Destination | IAB-node1 |
| IAB-node 4 | Next Hop | IAB-node2 |
| V2X-BHLocalRouteList at IAB-node2 | | |
| Reverse | | Forward |
| IAB-node 5 | Destination | IAB-node1 |
| IAB-node 3 | Next Hop | IAB-node1 |
| V2X-BHLocalRouteList at IAB-node1 | | |
| Reverse | | Forward |
| IAB-node 3 | Destination | null |
| IAB-node 2 | Next Hop | null |

Here, as an example, a V2X message may be generated in Terminal 1 (UE 1) 2411. In this case, Terminal 1 2411 may be a terminal accessing IAB node 3 2425. Accordingly, Terminal 1 2411 may transmit a V2X message to IAB node 3 2425. At this time, the RLC layer of IAB node 3 2425 may determine whether the V2X message received from Terminal 1 2411 has been received through the radio bearer for V2X. When the V2X message received from Terminal 1 2411 has been received through the radio bearer for V2X, the RLC layer of IAB node 3 2425 may deliver the message to a PDCP V2X sublayer. As an example, the PDCP V2X sublayer of each IAB node may be configured by the IAB donor, and is not limited to the above-described embodiment.

Thereafter, the PDU configured based on the data generated in Terminal 1 2411 may be delivered to the PDCP V2X sublayer of IAB node 3 2425. The PDCP V2X sublayer of IAB node 3 2425 may add security parameters to the PDU, and may transmit the PDU, to which the security parameters are added, to the BAP layer.

Here, it may be checked whether the data received by the BAP layer is data received through the above-described V2X radio bearer. When the data received by the BAP layer is data received through the above-described V2X radio bearer, the V2X local route bit of the BAP header may be set to enable. As an example, the V2X local routing bit of the BAP header may be 1-bit information included in the BAP header, and may indicate enable or disable based on whether data is received through a V2X radio bearer. After that, IAB node 3 2425 may configure a BAP address as a destination IAB node for V2X local routing in the BAP header. That is, the BAP header may include BAP address information indicating the destination IAB node of V2X local routing.

Thereafter, the BAP layer of IAB node 3 2425 may transmit the BAP PDU as a PDU, to which the security parameters are added, to the adjacent IAB node using a backhaul RLC channel. In this case, as an example, whether or not V2X local routing (V2X-LocalRoute) is configured differ between the IAB nodes 2423, 2424 and 2425. That is, V2X local routing may be configured in a specific IAB node, and V2X local routing may not be configured in other IAB nodes. In this case, when the IAB node in which V2X local routing is configured receives the BAP PDU, the IAB node may transmit the received PDU for data transmission to the accessing terminal to the PDCP V2X sublayer.

As a specific example, when V2X local routing is configured in IAB node 3 2425, the BAP PDU may be delivered from the BAP layer of IAB node 3 2425 to the PDCP V2X sublayer.

Here, as described above, Terminal 1 2411 may deliver data to IAB node 3 2425 through the V2X radio bearer. Also, as an example, data transmitted by Terminal 1 2411 may include information on a destination terminal. For example, the data transmitted by Terminal 1 2411 may be broadcast data, and destination information based on broadcasting may be set instead of destination information of a specific terminal. As another example, when Terminal 1 24110 transmits data to a specific terminal (unicast) or specific terminals (groupcast), the data may include destination information of a specific terminal or specific terminals, and is not limited to the above-described embodiment.

As an example, the V2X message transmitted from Terminal 1 2411 to Terminal 2 2412 through the IAB node may include address information of Terminal 2 2412. In this case, the BAP layer of IAB node 3 2425 that has received the V2X message from Terminal 1 2411 through the V2X radio bearer may deliver the PDU to the PDCP sublayer of IAB node 3 2425. Thereafter, the PDCP sublayer of IAB node 3 2425 may transmit the V2X message to Terminal 2 2412 accessing the IAB node 3 2425 as a destination terminal. As an example, the PDCP sublayer of IAB node 3 2425 may deliver data to the lower layer through a radio bearer.

As another example, the case where Terminal 1 2411 transmits the V2X message to terminal 3 2413 based on the local routing of the IAB node may be considered. In this case, the V2X message may include address information of terminal 3 2413 as destination information. Here, the BAP layer of IAB node 3 2425 may transmit the V2X message of Terminal 1 2411 to IAB node 2 2424 based on the BAP PDU. In this case, as an example, when Terminal 1 2411 delivers the V2X message through the V2X radio bearer, the V2X local route bit of the BAP header may be set to enable. Here, the case where V2X local routing is not configured in the IAB node 2 2424 that has received the BAP PDU from IAB node 3 2425 may be considered. In this case, the BAP layer of IAB node 2 2424 may check BAP header information in relation to the BAP PDU received from IAB node 3 2425. At this time, when the V2X local route bit is set to enable in the BAP header information, IAB node 2 2424 may check Next Hop information to transmit the PDU to the destination IAB node. Thereafter, IAB node 2 2424 may deliver the BAP PDU to the BAP of the IAB node 1 2423 based on Next Hop information. At this time, the BAP layer of IAB node 1 2423 may determine whether the V2X local routing bit of the BAP PDU header received from IAB node 2 2424 is set to enable. At this time, if the V2X local routing bit is set to enable, IAB node 1 2423 may determine whether it is the destination IAB for V2X local routing in the BAP header. In this case, if it is the same as the destination IAB node, IAB node 1 2423 may terminate the PDU delivery. After that, when V2X local routing (V2X-LocalRoute) is configured in IAB node 1 2423, IAB node 1 2423 may deliver the PDU received to the V2X message to terminal 3 2413 to the PDCP V2X sublayer of IAB node 1 2423 based on terminal information included in the V2X message. Thereafter, the PDCP V2X sublayer of IAB node 1 2423 may deliver the V2X message to terminal 3 2413 along the lower layer using a radio bearer.

Figure 25:
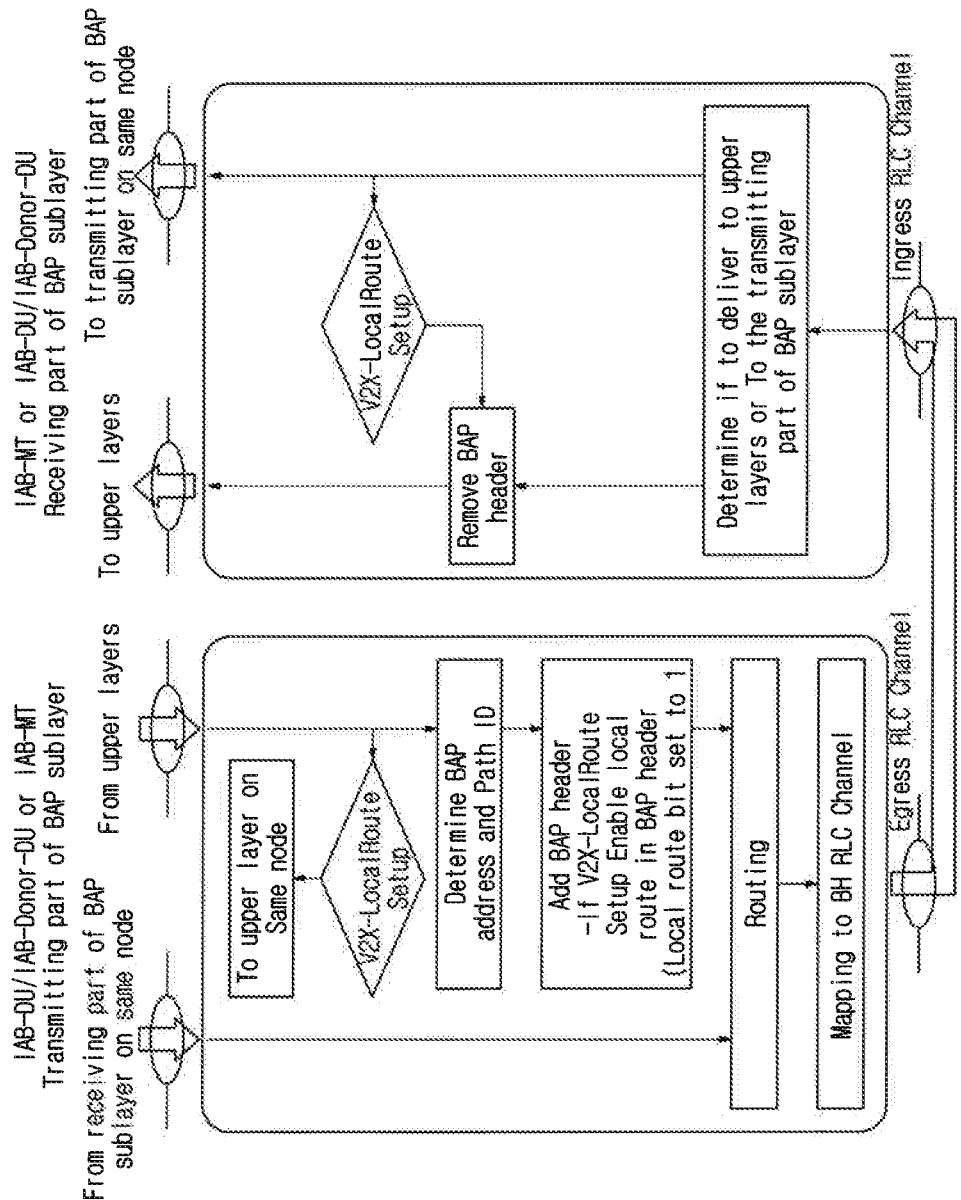
FIG. 25 is a view illustrating BAP entity operation of an IAB node according to an embodiment of the present disclosure.

FIG. 25 is a view illustrating BAP entity operation of an IAB node according to an embodiment of the present disclosure. Referring to FIG. 25, the BAP entity may be divided into a transmitting part for transmitting data and a receiving part for data reception. Here, the transmitting part of the BAP entity may receive the BAP SDU included in the BAP PDU from an upper layer. At this time, the transmitting part of the BAP entity may determine whether the above-described V2X local routing (V2X-LocalRoute) is configured. That is, it may be determined whether V2X local routing may be performed in the corresponding IAB node.

In this case, when V2X local routing (V2X-LocalRoute) is configured, the transmitting part of the BAP entity may duplicate data and transmit it to the PDCP V2X sublayer, which is an upper layer. In addition, when the transmitting part of the BAP entity receives the BAP SDU included in the BAP PDU from the upper layer, the transmitting part of the BAP entity may determine whether the data is data received through the V2X radio bearer. In the case of data received through the V2X radio bearer, the V2X local route bit of the BAP header may be set to 1. That is, the V2X local route bit may indicate enable. At this time, when the V2X local route bit of the BAP header is enable, the transmitting part of the BAP entity may configure the BAP address as a destination IAB node for V2X local routing in the BAP header. That is, the BAP header may include BAP address information indicating the destination IAB node of V2X local routing. Then, the transmitting part of the BAP entity may transmit the BAP PDU to the adjacent IAB node using the backhaul RLC channel.

Next, the operation of the BAP entity of the IAB node which has received the BAP PDU may be considered. In this case, the receiving part of the BAP entity may determine whether the V2X local route bit of the received BAP PDU is enable. In addition, the receiving part of the BAP entity may determine whether V2X local routing (V2X-LocalRoute) is configured in the corresponding IAB node.

For example, when V2X local routing (V2X-LocalRoute) is not configured, the receiving part of the BAP entity may deliver the BAP PDU to the transmitting part of the BAP entity, and may transmit the BAP PDU to another IAB node. On the other hand, when V2X local routing (V2X-LocalRoute) is configured and the V2X local route bit is enable, the receiving part of the BAP entity removes the BAP header and then delivers the BAP PDU to the PDCP V2X sublayer. Thereafter, the V2X message may be delivered from the PDCP V2X sublayer to the terminal accessed along the lower layer through the radio bearer.

Figure 26:
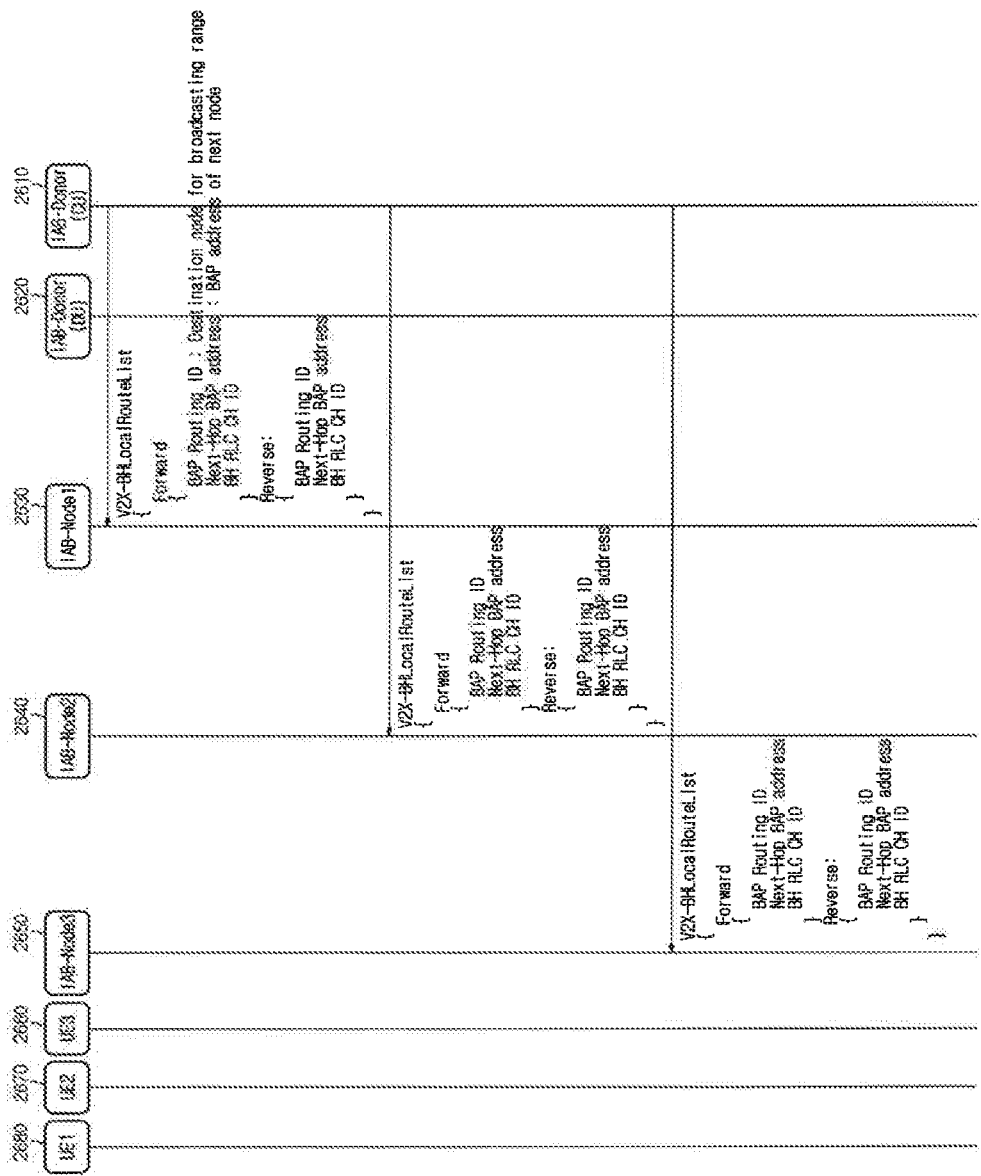
FIG. 26 is a view illustrating a method of configuring a local routing node list according to an embodiment of the present disclosure.

FIG. 26 is a view illustrating a method of configuring a local routing node list according to an embodiment of the present disclosure.

Referring to FIG. 26, the IAB donor may include one central unit (CU) 2610 and at least one distributed unit (DU). At this time, the CU 2610 of the IAB donor may control a service data adaptation protocol (SDAP) layer, a packet data convergence protocol (PDCP) layer, and a radio resource control (RRC) layer, and the DU 2620 of the IAB donor may control a radio resource control (RLC), medium access control (MAC), and physical (PHY) layers, and the CU 2610 of the IAB donor and the DU 2620 of the IAB donor may be connected through an F1 interface.

At this time, as an example, the CU 2610 of the IAB donor may deliver a DL RRC MESSAGE TRNAFER message to the DU 2620 of the IAB donor. At this time, the DL RRC MESSAGE TRNAFER may include V2X backhaul local routing list (V2X-BHlocalRout list) information. Thereafter, the DU 2620 of the IAB donor may provide V2X backhaul local routing list (V2X-BHlocalRout list) information by delivering the above-described message to each of the IAB nodes 2630, 2640 and 2650. At this time, as an example, the V2X backhaul local routing list information may include Next Hop and Destination IAB address information for recognizing adjacent IAB nodes in each of the IAB nodes 2630, 2640 and 2650 based on Table 9 described above.

That is, the IAB donor may configure an IAB node adjacent to each of the IAB nodes 2630, 2640 and 2650, and may provide Next Hop information as information on this. In addition, the IAB donor may configure address information of the destination IAB, to which data is delivered, to each of the IAB nodes 2630, 2640 and 2650 and, through this, data relay may be possible.

Figure 27:
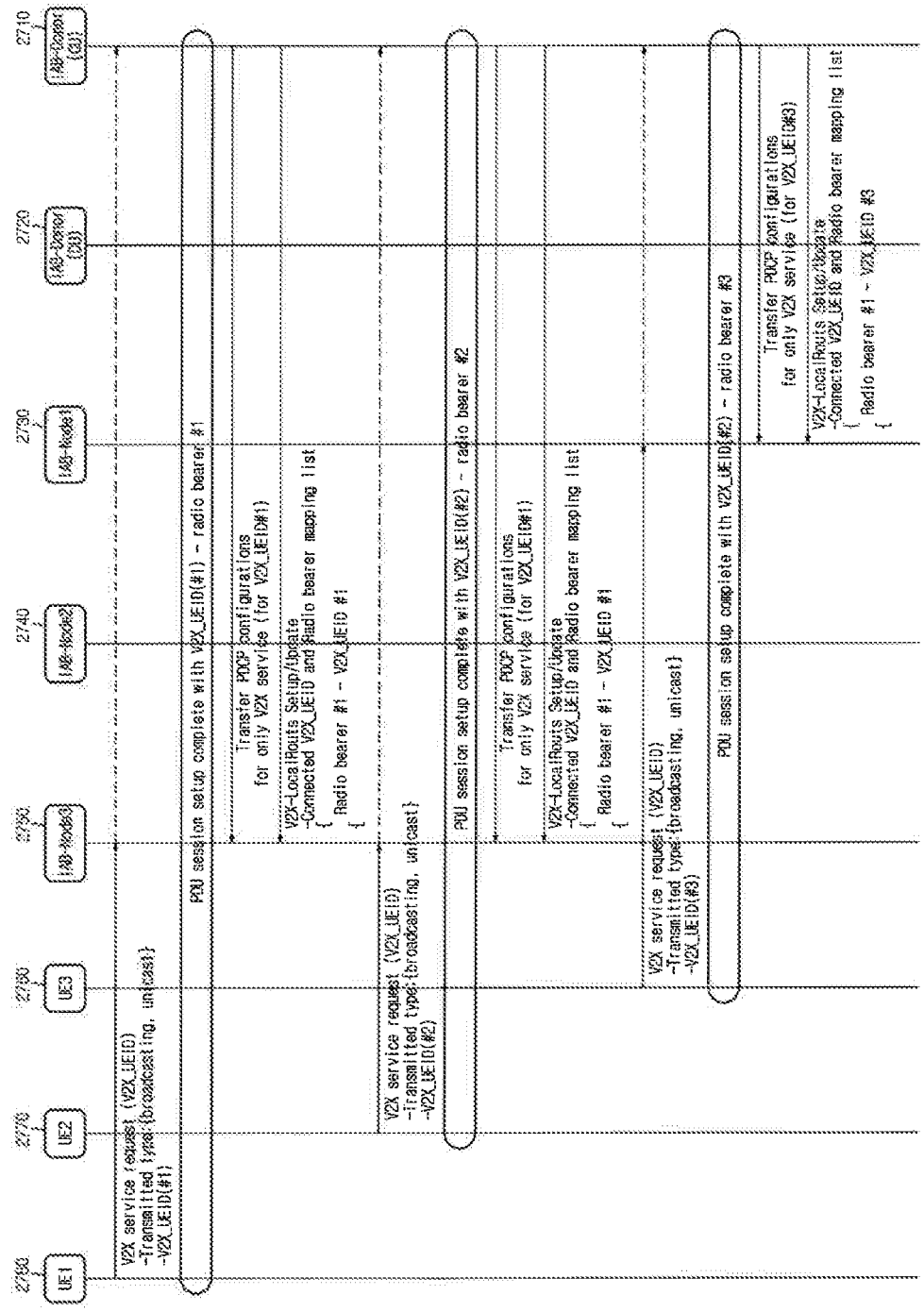
FIG. 27 is a view illustrating a method of setting up a PDU session between a terminal and an IAB donor according to an embodiment of the present disclosure.

FIG. 27 is a view illustrating a method of setting up a PDU session between a terminal and an IAB donor according to an embodiment of the present disclosure. Referring to FIG. 27, each of terminals 2760, 2770 and 2780 and the CU of the IAB donor may set up a PDU session by performing an attach procedure. In this case, the attach procedure may be performed in each IAB node.

More specifically, Terminal 1 (UE 1) 2780 may be a terminal accessing IAB node 3 2750. In this case, Terminal 1 2780 may set up a PDU session with the CU 2710 of the IAB donor through IAB node 3 2750 based on V2X UE ID #1. Here, Terminal 1 2780 may transmit a V2X service request message to IAB node 3 2750 based on V2X UE ID #1. As an example, the V2X service request message may include information on the V2X UE ID and information on a V2X transmission type described above, but is not limited thereto. Thereafter, IAB node 3 2750 may transmit the V2X service request message received from Terminal 1 2780 to the CU 2710 of the IAB donor, thereby setting up a PDU session.

After Terminal 1 2780 and the CU 2710 of the IAB donor set up a PDU session, the CU 2710 of the IAB donor may deliver a PDCP configuration for only the V2X service to IAB node 3 2750 accessed by Terminal 1 2780 based on V2X UE ID #1 which is the ID of Terminal 1 2780 in consideration of Terminal 1 2780. That is, in IAB node 3 2750, the above-described PDCP sublayer related configuration for V2X local routing may be set through the CU 2710 of the IAB donor. Also, as an example, the CU 2710 of the IAB donor may configure V2X local routing based on V2X UE ID #1 that is the ID of Terminal 1 2780 in consideration of Terminal 1 2780. Also, as an example, the CU 2710 of the IAB donor may update the V2X local routing configured based on V2X UE ID #1 that is the ID of Terminal 1 2780 in consideration of the Terminal 1 2780.

At this time, when configuring V2X local routing or updating configured V2X local routing, the CU 2710 of the IAB donor may deliver radio bearer mapping list information and ID information of the terminal connected to IAB node 3 2750. Through this, IAB node 3 2750 may check V2X local routing.

In addition, Terminal 2 (UE 2) 2770 may also be a terminal accessing IAB node 3 2750. In this case, Terminal 2 2770 may set up a PDU session with the CU 2710 of the IAB donor through IAB node 3 2750 based on V2X UE ID #2. Here, Terminal 2 2770 may transmit a V2X service request message to IAB node 3 2750 based on V2X UE ID #2. As an example, the V2X service request message may include information on a V2X UE ID and information on a V2X transmission type described above, but is not limited thereto. Thereafter, IAB node 3 2750 may deliver the V2X service request message received from Terminal 1 2780 to the CU 2710 of the IAB donor, thereby setting up a PDU session.

After Terminal 2 2770 and the CU 2710 of the IAB donor set up a PDU session, the CU 2710 of the IAB donor may deliver a PDCP configuration for only a V2X service to IAB node 3 2750 accessed by Terminal 2 2770 based on V2X UE ID #2 which is the ID of Terminal 2 2770 in consideration of Terminal 2 2770. That is, in IAB node 3 2750, the above-described PDCP sublayer related configuration for V2X local routing may be set through the CU 2710 of the IAB donor. Also, as an example, the CU 2710 of the IAB donor may configure V2X local routing based on V2X UE ID #2 that is the ID of Terminal 2 2770 in consideration of Terminal 2 2770. Also, as an example, the CU 2710 of the IAB donor may update V2X local routing configured based on V2X UE ID #2 that is the ID of Terminal 2 2770 in consideration of Terminal 2 2770. At this time, as an example, when configuring V2X local routing or updating configured V2X local routing, the CU 2710 of the IAB donor may deliver radio bearer mapping list information and ID information of the terminal connected to IAB node 3 2750. Through this, IAB node 3 2750 may check V2X local routing.

In addition, terminal 3 (UE 3) 2760 may also be a terminal accessing IAB node 1 2730. In this case, terminal 3 2760 may set up a PDU session with the CU 2710 of the IAB donor through IAB node 1 2730 based on V2X UE ID #3. Here, terminal 3 2760 may transmit a V2X service request message to IAB node 1 2730 based on V2X UE ID #3. As an example, the V2X service request message may include information on a V2X UE ID and information on a V2X transmission type described above, but is not limited thereto. Thereafter, IAB node 1 2730 may deliver the V2X service request message received from terminal 3 2760 to the CU 2710 of the IAB donor, thereby setting up a PDU session.

After terminal 3 2760 and the CU 2710 of the IAB donor set up a PDU session, the CU 2710 of the IAB donor may deliver a PDCP configuration for only a V2X service to IAB node 2 2760 accessed by terminal 3 2760 based on V2X UE ID #3 which is the ID of terminal 3 2760 in consideration of terminal 3 2760. That is, in IAB node 1 2730, the above-described PDCP sublayer related configuration for V2X local routing may be set through the CU 2710 of the IAB donor. Also, as an example, the CU 2710 of the IAB donor may configure V2X local routing based on V2X UE ID #3 that is the ID of terminal 3 2760 in consideration of terminal 3 2760. Also, as an example, the CU 2710 of the IAB donor may update V2X local routing configured based on V2X UE ID #3 that is the ID of terminal 3 2760 in consideration of terminal 3 2760. At this time, as an example, when configuring V2X local routing or updating configured V2X local routing, the CU 2710 of the IAB donor may deliver radio bearer mapping list information and ID information of the terminal connected to IAB node 1 2730. Through this, IAB node 1 2730 may check V2X local routing.

Figure 28:
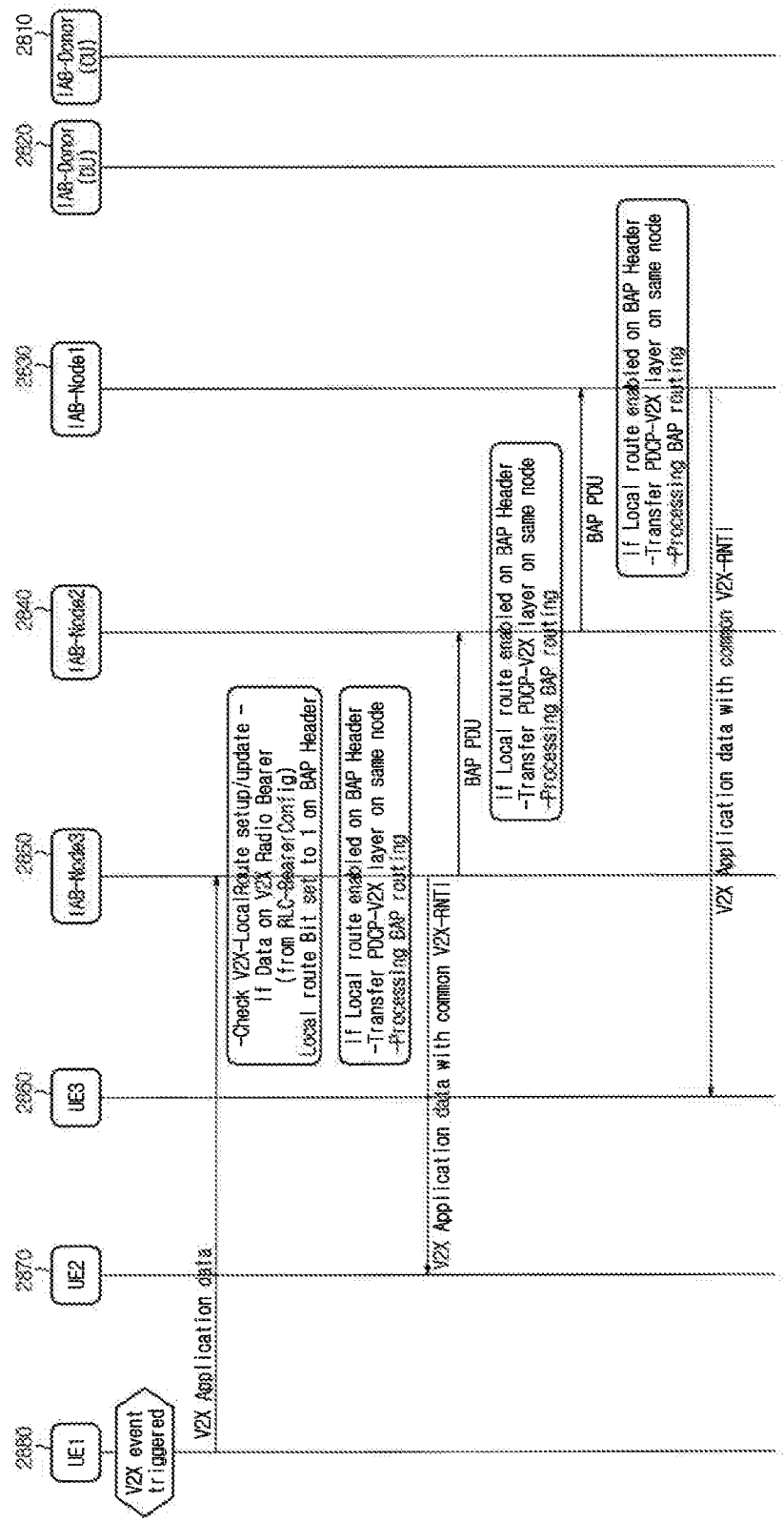
FIG. 28 is a view illustrating a method of performing local routing when data is generated in a terminal according to an embodiment of the present disclosure.

FIG. 28 is a view illustrating a method of performing local routing when data is generated in a terminal according to an embodiment of the present disclosure.

A configuration for V2X local routing may be set in each IAB node based on FIGS. 26 and 27 described above.

At this time, as an example, a case where a V2X event is triggered in Terminal 1 2880 may be considered. That is, a V2X message may be generated based on the triggered V2X event. As an example, the V2X message may include V2X application data and other related data, and is not limited to the above-described embodiment. In addition, as a transmission type of the V2X message, at least one of broadcast, groupcast or unicast may be determined. For example, based on the transmission type of the V2X message, the V2X message may include terminal information as destination information, as described above.

Here, Terminal 1 2880 may transmit the generated V2X message to accessed IAB node 3 2850. At this time, when the RLC layer of IAB node 3 2850 receives the V2X message through the V2X radio bearer, the RLC layer of IAB node 3 2850 may deliver the received V2X message (or data) to the PDCP sublayer. In this case, the PDCP sublayer of IAB node 3 2850 may set security parameters in data (or PDU) and deliver it to the BAP layer. At this time, when the RLC layer of IAB node 3 2850 receives the V2X message through the V2X radio bearer, the BAP layer of IAB node 3 2850 may set the V2X local routing bit of the BAP header to enable (e.g., 1). Also, the BAP layer of IAB node 3 2850 may configure a BAP address based on a destination IAB node and include information on it in the BAP header. In addition, as an example, the BAP layer may check a BAP path based on the above-described V2X backhaul local routing list (V2X-BHlocalRout list) and deliver the BAP PDU.

Here, as an example, when V2X local routing is configured in IAB node 3 2850, the BAP layer of IAB node 3 2850 may duplicate data and deliver it to the PDCP sublayer. As an example, when a terminal capable of V2X operation is connected to the IAB node, V2X local routing may be configured, as described above.

As an example, Terminal 2 2870 capable of V2X operation may be connected to IAB node 3 2850, and, when the destination terminal of the V2X message is Terminal 2 2870 or when V2X message transmission to Terminal 2 2870 is necessary based on broadcast, the BAP layer may deliver data to the PDCP sublayer in consideration of Terminal 2 2870. In this case, the PDCP sublayer may deliver data to the Terminal 2 2870 through a lower layer.

In addition, IAB node 3 2850 may check a BAP path based on a V2X backhaul local routing list (V2X-BHlocalRout list), and transmit the BAP PDU to another IAB node. As an example, it is included in the V2X backhaul local routing list (V2X-BHlocalRout list) of IAB node 3 2850, and the BAP PDU may be transmitted to IAB node 2 2840 indicated as a previous node. At this time, the V2X local routing bit in the BAP header is set to enable (e.g., 1), IAB node 2 2840 may transmit the BAP PDU to an adjacent IAB node again based on the V2X backhaul local routing list (V2X-BHlocalRout list), as described above. Here, when V2X local routing is configured in the IAB node which has received the BAP PDU, the IAB node may remove the BAP header from the BAP PDU and transmit data to the PDCP sublayer. Thereafter, the PDCP sublayer of the IAB node may transmit data to the accessing terminal through the lower layer. For example, in FIG. 28, IAB node 1 2830 may transmit data to accessed terminal 3 based on the configured V2X local routing after receiving the BAP from IAB node 2 2840, as described above.

Figure 29:
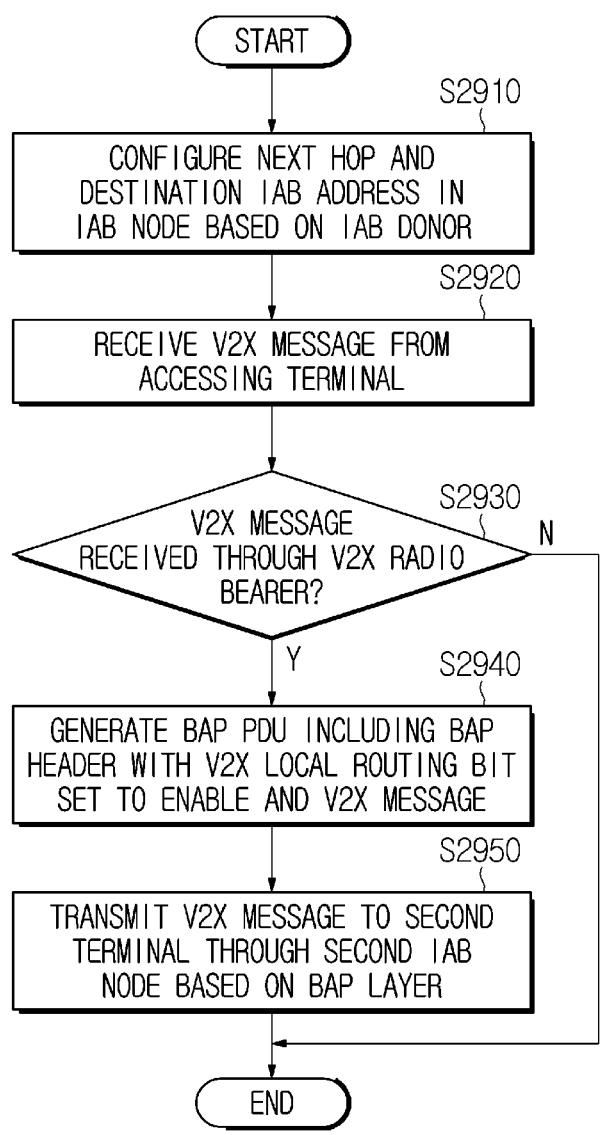
FIG. 29 is a view illustrating a method of transmitting and receiving a signal by an IAB signal according to an embodiment of the present disclosure.

FIG. 29 is a view illustrating a method of transmitting an additional information message together with NACK by a reception terminal according to an embodiment of the present disclosure.

Referring to FIG. 29, each IAB node may configure a next hop and a destination IAB address through an IAB donor (S2910). Through this, each IAB node may relay data to adjacent IAB nodes and a destination IAB node, as described above. Next, a V2X message may be received from the terminal accessing the IAB node (S2920). At this time, when the V2X message is received through a V2X radio bearer (S2930), the IAB node may generate a BAP PDU including a BAP header with a V2X local routing bit set to enable and a V2X message (S2940), and perform transmission to another terminal accessing another IAB node through a BAP layer (S2950).

In this case, as an example, the IAB node accessed by the terminal may include a PDCP sublayer for V2X. As an example, the PDCP configuration for V2X may be set by the IAB donor, as described above. Next, the V2X message may be received from the terminal through the RLC layer of the IAB node. In this case, the RLC layer of the IAB node may transmit the received V2X message to the PDCP sublayer. Thereafter, the PDCP sublayer for V2X may transmit the PDU to the BAP layer by adding security parameter settings to the V2X message.

Here, as an example, the V2X message transmitted by the terminal may include information on a destination terminal. In this case, when the terminal to which the V2X message is transmitted as the destination terminal accesses the same IAB node, the V2X message is delivered from the BAP layer to the PDCP layer for V2X, and then the V2X message may be transmitted to the destination terminal through the lower layer.

Also, as an example, when the destination terminal accesses another IAB node, the IAB node may transmit the BAP PDU including a V2X message to the adjacent IAB node through the BAP layer. In this case, the IAB node accessed by the destination terminal may deliver the received BAP PDU to the PDCP sublayer for V2X, and may transmit the V2X message to the destination terminal through the lower layer. At this time, as an example, when the IAB node transmits the V2X message through the BAP layer, the BAP header may further include destination IAB node information as well as the V2X local routing bit. As an example, when the destination IAB node of the BAP header is the same as the IAB node accessed by the destination terminal based on the V2X local routing bit set by enabling of the BAP header, the IAB node accessed by the destination terminal may transmit the V2X message to the accessing destination terminal through the BAP layer.

In addition, as an example, only when V2X local routing is configured in the IAB node, the IAB node may transmit the V2X message to the terminal. As an example, an IAB node in which V2X local routing is not configured may relay the BAP PDU through the BAP layer and transmit it to another IAB node, as described above.

Figure 30:
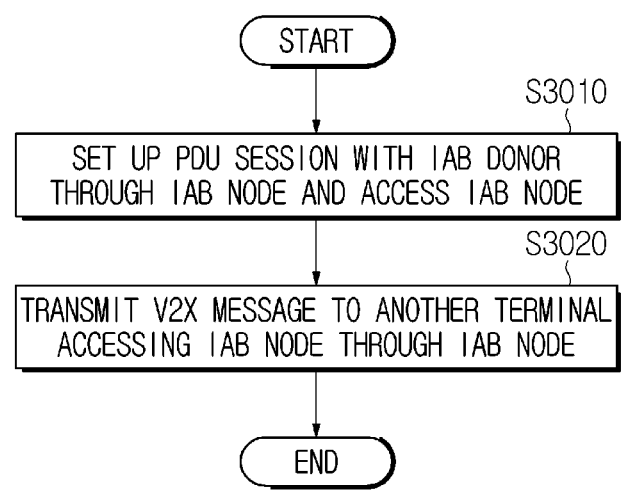
FIG. 30 is a view illustrating a method of transmitting and receiving a signal by a terminal according to an embodiment of the present disclosure.

FIG. 30 is a view illustrating a method of transmitting an additional information message together with NACK by a reception terminal according to an embodiment of the present disclosure.

Referring to FIG. 30, a terminal sets up a PDU session with an IAB donor through an IAB node, and may access the IAB node (S3010). Then, the terminal may transmit a V2X message to a terminal accessing another IAB node through the IAB node based on local routing (S3020). At this time, each IAB node may configure a next hop and a destination IAB address through an IAB donor. Through this, each of the IAB nodes may relay data to adjacent IAB nodes and the destination IAB node, as described above. Here, as an example, the terminal may transmit the V2X message to the IAB node through a V2X radio bearer. When the IAB node receives the V2X message through the V2X radio bearer, the IAB node may generate a BAP PDU including a BAP header with a V2X local routing bit set to enable and V2X message, and transmit perform transmission to another terminal accessing another IAB node through a BAP layer.

At this time, as an example, the IAB node accessed by the terminal may be provided with a PDCP sublayer for V2X. As an example, the PDCP configuration for V2X may be set by the IAB donor, as described above. Next, the terminal may transmit the V2X message to the IAB node based on the RLC layer. In this case, the RLC layer of the IAB node may transmit the received V2X message to the PDCP sublayer. Thereafter, the PDCP sublayer for V2X may transmit the PDU to the BAP layer by adding security parameter settings to the V2X message.

Here, as an example, the V2X message transmitted by the terminal may include information on the destination terminal. In this case, when the terminal to which the V2X message is transmitted as the destination terminal accesses the same IAB node, the V2X message may be delivered from the BAP layer to the PDCP layer for V2X, and then the V2X message may be transmitted to the destination terminal through the lower layer.

Also, as an example, when the destination terminal accesses another IAB node, the IAB node may transmit a BAP PDU including the V2X message to an adjacent IAB node through the BAP layer. In this case, the IAB node accessed by the destination terminal may deliver the received BAP PDU to the PDCP sublayer for V2X, and may transmit the V2X message to the destination terminal through the lower layer. At this time, as an example, when the IAB node transmits the V2X message through the BAP layer, the BAP header may further include destination IAB node information as well as a V2X local routing bit. As an example, when the destination IAB node of the BAP header is the same as the IAB node accessed by the destination terminal based on the V2X local routing bit set by enabling of the BAP header, the IAB node accessed by the destination terminal may transmit the V2X message to the accessing destination terminal through the BAP layer.

In addition, as an example, only when V2X local routing is configured in the IAB node, the IAB node may transmit the V2X message to the terminal. As an example, an IAB node in which V2X local routing is not configured may relay the BAP PDU through the BAP layer and deliver it to another IAB node, as described above.

System and Various Devices to which Embodiments of the Present Disclosure are Applicable Various embodiments of the present disclosure may be mutually combined.

Hereinafter, an apparatus to which various embodiments of the present disclosure is applicable will be described. Although not limited thereto, various descriptions, functions, procedures, proposals, methods, and/or flowcharts disclosed herein may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 31:
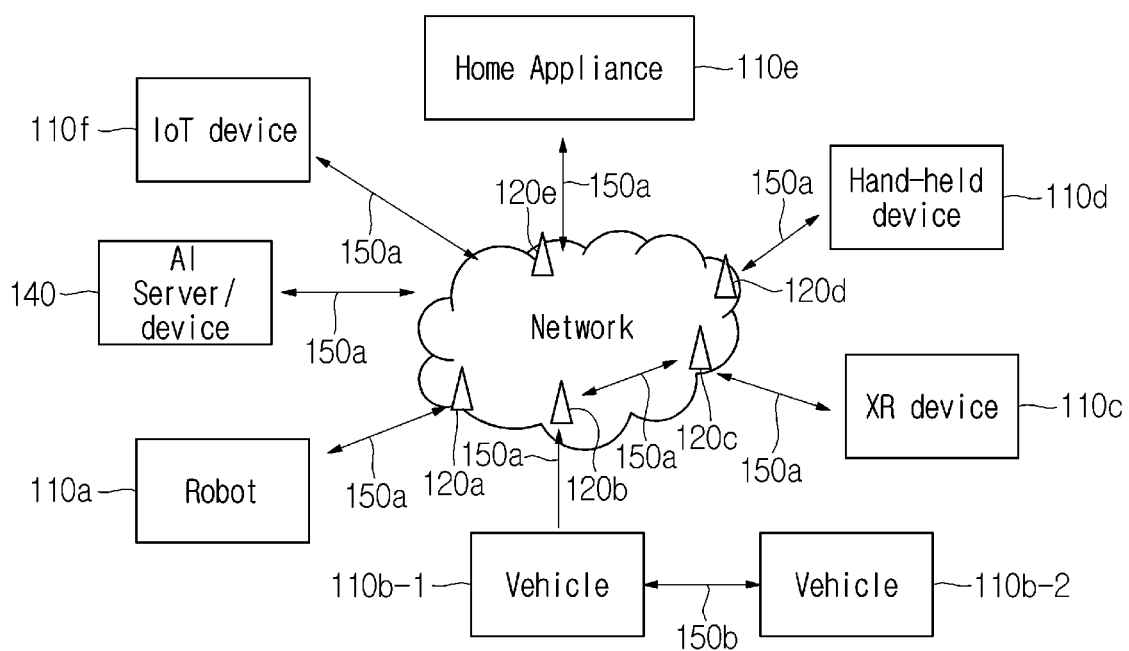
FIG. 31 illustrates an example of a communication system according to an embodiment of the present disclosure.

FIG. 31 illustrates a communication system applicable to the present disclosure. The embodiment of FIG. 31 may be combined with various embodiments of the present disclosure.

Referring to FIG. 31, the communication system applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include at least one of a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120a to 120e network may be implemented by a wireless device, and a specific wireless device 120a may operate as a base station/network node for another wireless device.

Here, the wireless communication technology implemented in the wireless devices 110a to 110f of the present specification may include a narrowband Internet of Things for low-power communication as well as LTE, NR, and 6G. At this time, for example, NB-IoT technology may be an example of LPWAN (Low Power Wide Area Network) technology, may be implemented in standards such as LTE Cat NB1 and/or LTE Cat NB2, and is not limited to the above-described names. Additionally or alternatively, the wireless communication technology implemented in the wireless devices 110a to 110f of the present specification may perform communication based on LTE-M technology. In this case, as an example, the LTE-M technology may be an example of an LPWAN technology, and may be called by various names such as enhanced machine type communication (eMTC). For example, LTE-M technology may be implemented in at least one of 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 110a to 110f of the present specification may include at least one of ZigBee, Bluetooth, and Low Power Wide Area Network (LPWAN) in consideration of low power communication, and is not limited to the above-described names. For example, the ZigBee technology may create PAN (personal area networks) related to small/low-power digital communication based on various standards such as IEEE 802.15.4, and may be called by various names.

The wireless devices 100a to 100f may be connected to the network through the base station 120. AI technology is applicable to the wireless devices 100a to 100f, and the wireless devices 100a to 100f may be connected to the AI server 100g through the network. The network may be configured using a 3G network, a 4G (e.g., LTE) network or a 5G (e.g., NR) network, etc. The wireless devices 100a to 100f may communicate with each other through the base stations 120a to 120e or perform direct communication (e.g., sidelink communication) without through the base stations 120a to 120e. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base stations 120a to 120e and the base stations 120a to 120e/the base stations 120a to 120e. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Figure 32:
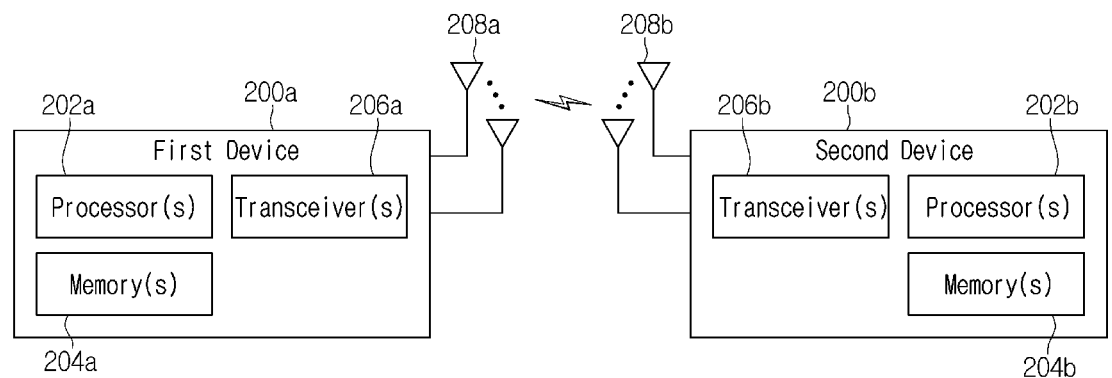
FIG. 32 illustrates an example of a wireless device according to an embodiment of the present disclosure.

FIG. 32 illustrates wireless devices applicable to the present disclosure. The embodiment of FIG. 32 may be combined with various embodiments of the present disclosure.

Referring to FIG. 32, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be coupled with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be coupled with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may perform wireless communications with the first wireless device 200a and may include one or more processors 202b and one or more memories 204b and may further include one or more transceivers 206b and/or one or more antennas 208b. The functions of one or more processors 202b, one or more memories 204b, one or more transceivers 206b, and/or one or more antennas 208b may be similar to those of one or more processors 202a, one or more memories 204a, one or more transceivers 206a and/or one or more antennas 208a of the first wireless device 200a.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs), one or more service data unit (SDU), messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be coupled with one or more processors 202a and 202b to store various types of data, signals, messages, information, programs, code, instructions and/or commands One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be coupled with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. In addition, one or more transceivers 206a and 206b may be coupled with one or more antennas 208a and 208b, and may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Figure 33:
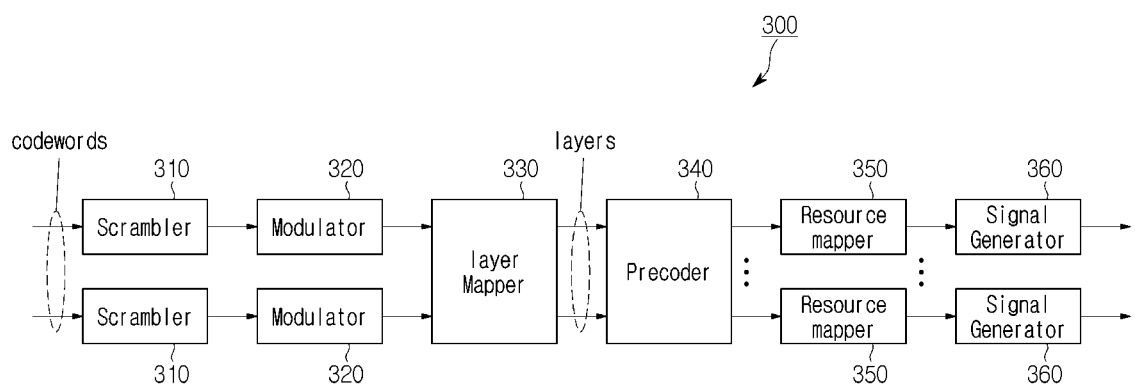
FIG. 33 illustrates a circuit for processing a transmission signal according to an embodiment of the present disclosure.

FIG. 33 illustrates a signal process circuit for a transmission signal applicable to the present disclosure. The embodiment of FIG. 33 may be combined with various embodiments of the present disclosure.

Referring to FIG. 33, a signal processing circuit 300 may include scramblers 310, modulators 320, a layer mapper 330, a precoder 340, resource mappers 350, and signal generators 360. For example, an operation/function of FIG. 33 may be performed by the processors 202a and 202b and/or the transceivers 206a and 206b of FIG. 32. Hardware elements of FIG. 33 may be implemented by the processors 202a and 202b and/or the transceivers 36 and 206 of FIG. 32. For example, blocks 310 to 360 may be implemented by the processors 202a and 202b of FIG. 32. Alternatively, the blocks 310 to 350 may be implemented by the processors 202a and 202b of FIG. 32 and the block 360 may be implemented by the transceivers 206a and 206b of FIG. 32, and it is not limited to the above-described embodiment.

Codewords may be converted into radio signals via the signal processing circuit 300 of FIG. 33. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH) of FIG. 33. Specifically, the codewords may be converted into scrambled bit sequences by the scramblers 310. Scramble sequences used for scrambling may be generated based on an initialization value, and the initialization value may include ID information of a wireless device. The scrambled bit sequences may be modulated to modulation symbol sequences by the modulators 320. A modulation scheme may include pi/2-Binary Phase Shift Keying (pi/2-BPSK), m-Phase Shift Keying (m-PSK), and m-Quadrature Amplitude Modulation (m-QAM).

Complex modulation symbol sequences may be mapped to one or more transport layers by the layer mapper 330. Modulation symbols of each transport layer may be mapped (precoded) to corresponding antenna port(s) by the precoder 340. Outputs z of the precoder 340 may be obtained by multiplying outputs y of the layer mapper 330 by an N*M precoding matrix W. Herein, N is the number of antenna ports and M is the number of transport layers. The precoder 340 may perform precoding after performing transform precoding (e.g., DFT) for complex modulation symbols. Alternatively, the precoder 340 may perform precoding without performing transform precoding.

The resource mappers 350 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 360 may generate radio signals from the mapped modulation symbols and the generated radio signals may be transmitted to other devices through each antenna. For this purpose, the signal generators 360 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures of FIG. 33. For example, the wireless devices (e.g., 200a and 200b of FIG. 32) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 34:
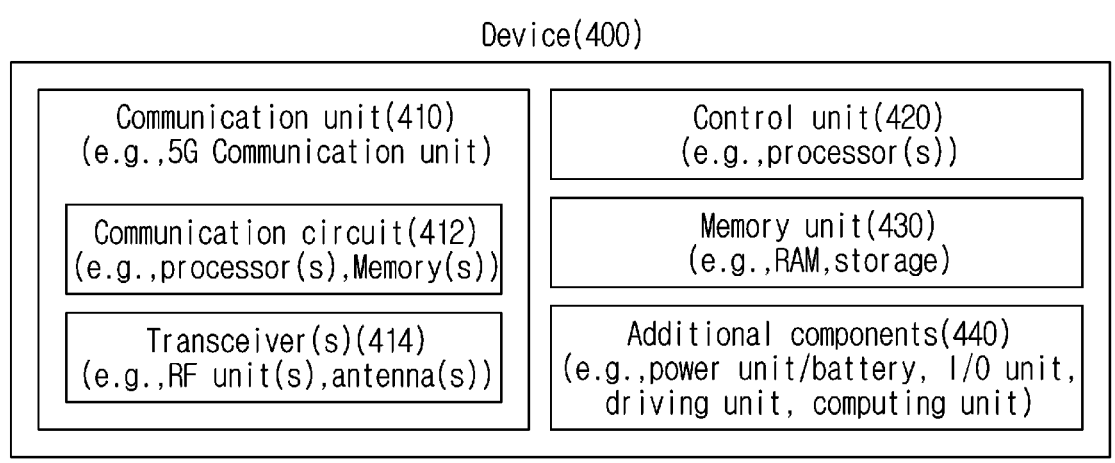
FIG. 34 illustrates another example of a wireless device according to an embodiment of the present disclosure.

FIG. 34 shows another example of a wireless device according to an embodiment of the present disclosure. FIG. 34 may be combined with various embodiments of the present disclosure.

Referring to FIG. 34, a wireless device 300 corresponds to the wireless devices 200a and 200b of FIG. 32, and may include various elements, components, units/portions, and/or modules. For example, the wireless device 400 may include a communication unit 410, a control unit 420, a memory unit 430, and an additional component 440.

The communication unit 410 may include a communication circuit 412 and transceiver(s) 414. The communication unit 410 may transmit and receive signals (e.g., data, control signals, etc.) to and from other wireless devices and base stations. For example, the communication circuit 412 may include one or more processors 202a and 202b and/or one or more memories 204a and 204b of FIG. 32. For example, the transceiver(s) 414 may include one or more transceivers 206a and 206b and/or one or more antennas 208a and 208b of FIG. 32.

The control unit 420 may be composed of a set of one or more processors. For example, the control unit 420 may include a set of a communication control processor, an application processor (AP), an electronic control unit (ECU), a graphic processing processor, a memory control processor, and the like. The control unit 420 is electrically connected to the communication unit 410, the memory unit 430, and the additional component 440, and controls general operations of the wireless device. For example, the controller 420 may control electrical/mechanical operation of the wireless device based on the program/code/command/information stored in the memory unit 430. In addition, the control unit 420 may transmit the information stored in the memory unit 430 to the outside (e.g., another communication device) through the communication unit 410 through a wireless/wired interface, or store, in the memory unit 430, information received from the outside (e.g., another communication device) through the communication unit 410 through a wireless/wired interface.

The memory unit 430 may be composed of a RAM, a DRAM (dynamic RAM), a ROM, a flash memory, a volatile memory, a non-volatile memory and/or a combination thereof. The memory unit 430 may store data/parameters/programs/codes/commands necessary to drive the wireless device 400. Also, the memory unit 430 may store input/output data/information.

The additional component 440 may be variously configured according to the type of the wireless device. For example, the additional component 440 may include at least one of a power unit/battery, an input/output unit, a driving unit, and a computing unit. Although not limited thereto, the wireless device 400 may be implemented in the form of a robot (FIGS. 1, 110a), a vehicle (FIGS. 1, 110b-1 and 110b-2), an XR device (FIGS. 1, 110c), and a mobile device (FIGS. 1, 110d), home appliance (FIGS. 1, 110e), an IoT device (FIGS. 1, 110f), a digital broadcasting terminal, a hologram device, a public safety device, an MTC device, a medical device, a fintech device (or financial device), a security device, a climate/environment device, an AI server/device (FIGS. 1m 140), a base station (FIGS. 1, 120), and a network node. The wireless device may be mobile or used in a fixed location according to the use-example/service.

Figure 35:
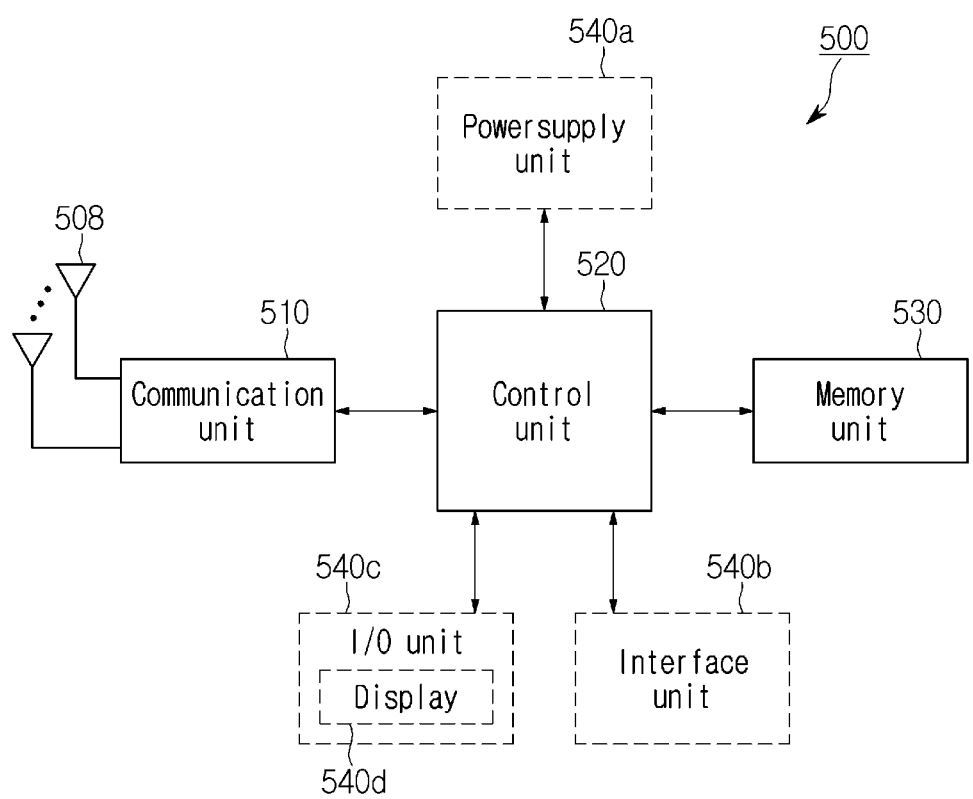
FIG. 35 illustrates a hand-held device according to an embodiment of the present disclosure.

FIG. 35 illustrates a hand-held device applicable to the present disclosure. FIG. 35 exemplifies a hand-held device applicable to the present disclosure. The hand-held device may include a smartphone, a smart pad, a wearable device (e.g., a smart watch or smart glasses), and a hand-held computer (e.g., a laptop, etc.). The embodiment of FIG. 35 may be combined with various embodiments of the present disclosure.

Referring to FIG. 35, the hand-held device 500 may include an antenna unit (antenna) 508, a communication unit (transceiver) 510, a control unit (controller) 520, a memory unit (memory) 530, a power supply unit (power supply) 540a, an interface unit (interface) 540b, and an input/output unit 540c. An antenna unit (antenna) 508 may be part of the communication unit 510. The blocks 510 to 530/440a to 540c may correspond to the blocks 310 to 330/340 of FIG. 35, respectively, and duplicate descriptions are omitted.

The communication unit 510 may transmit and receive signals and the control unit 520 may control the hand-held device 500, and the memory unit 530 may store data and so on. The power supply unit 540a may supply power to the hand-held device 500 and include a wired/wireless charging circuit, a battery, etc. The interface unit 540b may support connection between the hand-held device 500 and another external device. The interface unit 540b may include various ports (e.g., an audio input/output port and a video input/output port) for connection with the external device. The input/output unit 540c may receive or output video information/signals, audio information/signals, data and/or user input information. The input/output unit 540c may include a camera, a microphone, a user input unit, a display 540d, a speaker and/or a haptic module.

For example, in case of data communication, the input/output unit 540c may acquire user input information/signal (e.g., touch, text, voice, image or video) from the user and store the user input information/signal in the memory unit 530. The communication unit 510 may convert the information/signal stored in the memory into a radio signal and transmit the converted radio signal to another wireless device directly or transmit the converted radio signal to a base station. In addition, the communication unit 510 may receive a radio signal from another wireless device or the base station and then restore the received radio signal into original information/signal. The restored information/signal may be stored in the memory unit 530 and then output through the input/output unit 540c in various forms (e.g., text, voice, image, video and haptic).

Figure 36:
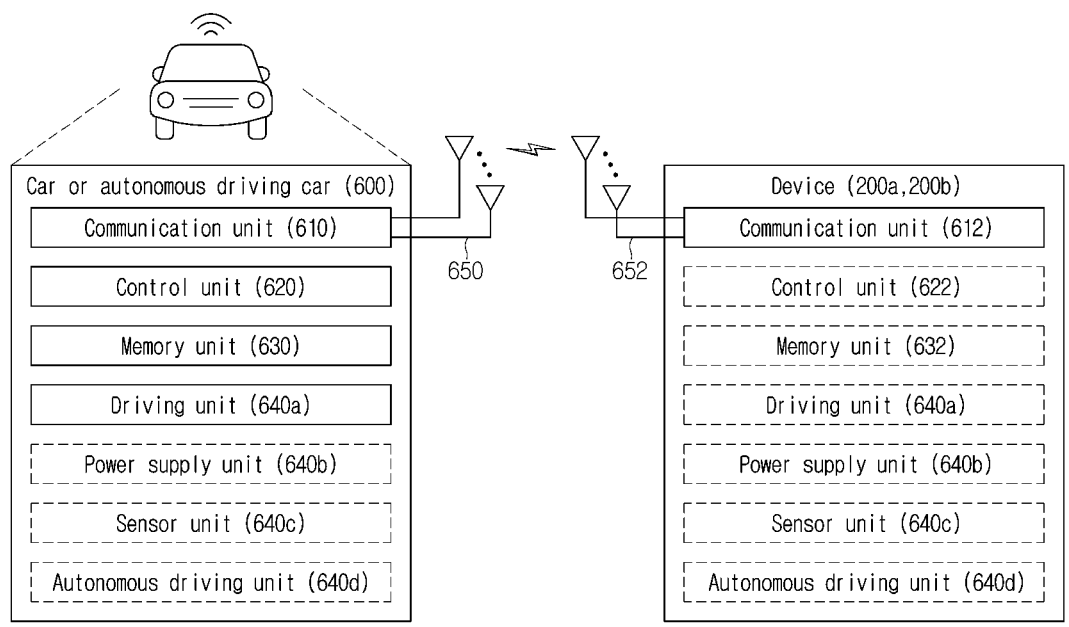
FIG. 36 illustrates an example of a car or an autonomous vehicle according to an embodiment of the present disclosure.

FIG. 36 illustrates a car or an autonomous vehicle applicable to the present disclosure. FIG. 36 exemplifies a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited. The embodiment of FIG. 36 may be combined with various embodiments of the present disclosure.

Referring to FIG. 36, the car or autonomous driving car 600 may include an antenna unit (antenna) 608, a communication unit (transceiver) 610, a control unit (controller) 620, a driving unit 640a, a power supply unit (power supply) 640b, a sensor unit 640c, and an autonomous driving unit 640d. The antenna unit 650 may be configured as part of the communication unit 610. The blocks 610/630/640a to 640d correspond to the blocks 510/530/540 of FIG. 35, and duplicate descriptions are omitted.

The communication unit 610 may transmit and receive signals (e.g., data, control signals, etc.) to and from external devices such as another vehicle, a base station (e.g., a base station, a road side unit, etc.), and a server. The control unit 620 may control the elements of the car or autonomous driving car 600 to perform various operations. The control unit 620 may include an electronic control unit (ECU). The driving unit 640a may drive the car or autonomous driving car 600 on the ground. The driving unit 640a may include an engine, a motor, a power train, wheels, a brake, a steering device, etc. The power supply unit 640b may supply power to the car or autonomous driving car 600, and include a wired/wireless charging circuit, a battery, etc. The sensor unit 640c may obtain a vehicle state, surrounding environment information, user information, etc. The sensor unit 640c may include an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving sensor 640*d* may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 610 may receive map data, traffic information data, etc. from an external server. The autonomous driving unit 640*d* may generate an autonomous driving route and a driving plan based on the acquired data. The control unit 620 may control the driving unit 640*a* (e.g., speed/direction control) such that the car or autonomous driving car 600 moves along the autonomous driving route according to the driving plane. During autonomous driving, the communication unit 610 may aperiodically/periodically acquire latest traffic information data from an external server and acquire surrounding traffic information data from neighboring cars. In addition, during autonomous driving, the sensor unit 640*c* may acquire a vehicle state and surrounding environment information. The autonomous driving unit 640*d* may update the autonomous driving route and the driving plan based on newly acquired data/information. The communication unit 610 may transmit information such as a vehicle location, an autonomous driving route, a driving plan, etc. to the external server. The external server may predict traffic information data using AI technology or the like based on the information collected from the cars or autonomous driving cars and provide the predicted traffic information data to the cars or autonomous driving cars.

As an example, a device including at least one memory and at least one processor functionally connected to the at least one memory may be considered based on the device of FIGS. 31 to 36 described above. At this time, the at least one processor configures a next hop and a destination IAB address of the device based on an IAB donor, receives a V2X message from a first terminal accessing the device, and transmits the V2X message to a second terminal accessing another device through another device based on local routing. When the device receives the V2X message from the first terminal through a V2X radio bearer, a backhaul adaptation protocol (BAP) packet data unit (PDU) including a BAP header with a V2X local routing bit set to enable and the V2X message may be generated, and the V2X message may be transmitted to the second terminal through another device node based on a BAP layer.

In addition, as an example, a non-transitory computer-readable medium storing at least one instruction may be considered. In this case, it includes at least one instruction executable by the processor, the at least one instruction enables the device to configure a next hop and a destination IAB address of the device based on an IAB donor, to receive a V2X message from a first terminal accessing the device, to transmit the V2X message to a second terminal accessing another device through another device based on local routing. When the device receives the V2X message from the first terminal through a V2X radio bearer, a backhaul adaptation protocol (BAP) packet data unit (PDU) including a BAP header with a V2X local routing bit set to enable and the V2X message may be generated, and the V2X message may be transmitted to the second terminal through another device node based on a BAP layer.

Since examples of the above-described proposed method may also be included as one of the implementation methods of the present disclosure, it is clear that they may be regarded as a kind of proposed method. In addition, the above-described proposed methods may be implemented independently, or may be implemented in the form of a combination (or merge) of some of the proposed methods. The rule may be defined so that a base station notifies a terminal of the information on whether the proposed methods are applied (or information on the rules of the proposed methods) through a predefined signal (e.g., a physical layer signal or a higher layer signal).

The present disclosure may be embodied in other specific forms without departing from the technical ideas and essential characteristics described in the present disclosure. Accordingly, the above detailed description should not be construed as restrictive in all respects but as exemplary. The scope of the present disclosure should be determined by a reasonable interpretation of the appended claims, and all modifications within the equivalent scope of the present disclosure are included in the scope of the present disclosure. In addition, claims that are not explicitly cited in the claims may be combined to form an embodiment or may be included as a new claim by amendment after the application is filed.

INDUSTRIAL AVAILABILITY

Embodiments of the present disclosure may be applied to various radio access systems. As an example of various radio access systems, there is a $3^{rd}$ Generation Partnership Project (3GPP) or a 3GPP2 system.

Embodiments of the present disclosure may be applied not only to the various radio access systems, but also to all technical fields to which the various radio access systems are applied. Furthermore, the proposed method may be applied to mmWave and THz communication systems using very high frequency bands.

Additionally, embodiments of the present disclosure is applicable to various applications such as autonomous vehicles and drones.

What is claimed is:

1. A method of transmitting a signal by a first terminal, the method comprising:
   receiving downlink control information (DCI) including information related to vehicle to everything (V2X);
   performing synchronization based on a sidelink synchronization signal (SLSS), wherein the SLSS includes a primary sidelink synchronization signal (PSSS) and a secondary sidelink synchronization signal (SSSS);
   determining one or more resource pools, wherein the one or more resource pools are configured by a base station based on sidelink resource allocation mode 1, or the one or more resource pools are determined by the first terminal based on sidelink resource allocation mode 2, wherein a resource pool includes a plurality of contiguous frequency resources in a frequency domain, and a set of slots in a time domain;
   setting up a packet data unit (PDU) session with an integrated access and backhaul (IAB) donor through a first IAB node, wherein a next hop and a destination IAB address are configured in the first IAB node based on the IAB donor;
   accessing the first IAB node; and
   transmitting a V2X message to a second terminal accessed to a second IAB node through the first IAB node, wherein the V2X message is transmitted to the second terminal through the second IAB node based on a backhaul adaptation protocol (BAP) layer, and wherein the V2X message is identified based on whether the V2X message is transmitted through a V2X radio bearer or not, by the BAP layer of the first IAB node.

2. The method of claim 1, wherein the V2X message is transmitted through a V2X radio bearer, and a BAP PDU comprising a BAP header with a V2X local routing bit set to enable and the V2X message is generated in the first IAB node.

3. The method of claim 2, wherein the first IAB node comprises a packet data convergence protocol (PDCP) sublayer for V2X, wherein the first IAB node receives the V2X message from the first terminal through a radio link control (RLC) layer of the first IAB node and provides the V2X message to the PDCP sublayer for V2X, and wherein the PDCP sublayer for V2X configures security parameter to the V2X message and delivers it to the BAP layer.

4. The method of claim 3, wherein the V2X message comprises information of the second terminal to which the V2X message is delivered.

5. The method of claim 4, wherein the V2X message is delivered from the BAP layer to the PDCP layer for V2X based on that the first IAB node is same as the second IAB node, and wherein the V2X message is delivered from the PDCP layer for V2X to the second terminal through a lower layer.

6. The method of claim 4, wherein, the V2X message is delivered from the first IAB node to the second IAB node through the BAP layer based on that the first IAB node and the second IAB node are different, and wherein the V2X message is delivered to the PDCP layer for V2X of the second IAB node based on the BAP layer and then is transmitted to the second terminal through a lower layer.

7. The method of claim 4, wherein the BAP header further comprises destination IAB node information, and wherein the second IAB node transmits the V2X message to the second terminal through the BAP layer, when the destination IAB node of the BAP header is the second IAB node based on the V2X local routing bit, which is set to enable, of the BAP header.

8. The method of claim 7, wherein the V2X message is transmitted to the second terminal accessed to the second IAB node based on that V2X local routing is configured in the second IAB node.

9. The method of claim 4, wherein the V2X message is transmitted from the first IAB node to the second terminal of the second IAB node through a third IAB node based on the BAP layer based on that the first IAB node and the second IAB node are different.

10. The method of claim 9, wherein the third IAB node is an IAB node in which V2X local routing is not configured and the second IAB node is an IAB node in which the V2X local routing is configured.

11. The method of claim 1, wherein the first terminal and the IAB node set up a PDU session through the first IAB node based on ID information of the first terminal, and where, when the PDU session is set up, the first IAB node receives PDCP configuration information for V2X and V2X local routing configuration information from the IAB donor node.

12. A first terminal transmitting a signal in a wireless communication system, the first terminal comprising:

a transceiver; and a processor connected to the transceiver, wherein the processor is configured to:

receive downlink control information (DCI) including information related to vehicle to everything (V2X), perform synchronization based on a sidelink synchronization signal (SLSS), wherein the SLSS includes a primary sidelink synchronization signal (PSSS) and a secondary sidelink synchronization signal (SSSS), determine one or more resource pools, wherein the one or more resource pools are configured by a base station based on sidelink resource allocation mode 1, and the one or more resource pools are determined by the first terminal based on sidelink resource allocation mode 2, wherein a resource pool includes a plurality of contiguous frequency resources in a frequency domain, and a set of slots in a time domain, set up a packet data unit (PDU) session with an integrated access and backhaul (IAB) donor through a first IAB node, wherein a next hop and a destination IAB address are configured in the first IAB node based on the IAB donor, access the first IAB node, and transmit a V2X message to a second terminal accessing a second IAB node through the first IAB node, wherein the V2X message is transmitted to the second terminal through the second IAB node based on a backhaul adaptation protocol (BAP) layer, and wherein the V2X message is identified based on whether the V2X message is transmitted through a V2X radio bearer or not, by the BAP layer of the first IAB node.

13. A first integrated access and backhaul (IAB) node performing local routing in a wireless communication system, the first IAB node comprising:

a transceiver; and a processor connected to the transceiver, wherein the processor is configured to:

configure a next hop and a destination IAB address of a first IAB node based on an IAB donor;

receive a V2X message from a first terminal accessed to the first IAB node; and transmit the V2X message to a second terminal accessed to the second IAB node through a second IAB node based on the local routing, wherein downlink control information (DCI) including information related to vehicle to everything (V2X) is received by each of the first terminal and the second terminal, wherein synchronization based on a sidelink synchronization signal (SLSS) is performed by the first terminal and the second terminal, the SLSS includes a primary sidelink synchronization signal (PSSS) and a secondary sidelink synchronization signal (SSSS), wherein one or more resource pools are determined, the one or more resource pools are configured by a base station based on sidelink resource allocation mode 1, or the one or more resource pools are determined by the first terminal based on sidelink resource allocation mode 2, wherein a resource pool includes a plurality of contiguous frequency resources in a frequency domain, and a set of slots in a time domain, wherein the V2X message is transmitted to the second terminal through the second IAB node based on a backhaul adaptation protocol (BAP) layer, and wherein the V2X message is identified based on whether the V2X message is transmitted through a V2X radio bearer or not, by the BAP layer of the first IAB node.

* * * * *